US012502963B2

(12) United States Patent
Sasaki

(10) Patent No.: US 12,502,963 B2
(45) Date of Patent: Dec. 23, 2025

(54) VEHICLE CONTENT PRESENTATION CONTROL SYSTEM, VEHICLE, AND NON-TRANSITORY RECORDING MEDIUM

(71) Applicant: SUBARU CORPORATION, Tokyo (JP)

(72) Inventor: Kou Sasaki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 65 days.

(21) Appl. No.: 18/597,394

(22) Filed: Mar. 6, 2024

(65) Prior Publication Data

US 2024/0308346 A1 Sep. 19, 2024

(30) Foreign Application Priority Data

Mar. 14, 2023 (JP) .................................. 2023-039671

(51) Int. Cl.
*B60K 35/81* (2024.01)
*B60W 60/00* (2020.01)
*G06F 21/44* (2013.01)

(52) U.S. Cl.
CPC ........... *B60K 35/81* (2024.01); *B60W 60/005* (2020.02); *G06F 21/44* (2013.01)

(58) Field of Classification Search
CPC .......... B60K 35/81; B60W 2040/0809; B60W 40/08; B60W 60/0013; B60W 60/005; G06F 21/44
See application file for complete search history.

(56) References Cited

U.S. PATENT DOCUMENTS

| 7,328,458 | B2 * | 2/2008 | Yamanaka | H04L 63/06 |
| | | | | 726/30 |
| 9,426,650 | B2 * | 8/2016 | Bangole | H04W 4/46 |
| 9,578,104 | B2 * | 2/2017 | Bangole | H04L 63/062 |
| 10,005,391 | B2 * | 6/2018 | Mori | B60Q 9/00 |
| 10,226,702 | B2 * | 3/2019 | Hoory | A63F 13/65 |
| 11,911,693 | B2 * | 2/2024 | Lake-Schaal | A63F 13/69 |
| 2008/0291032 | A1 * | 11/2008 | Prokhorov | B60W 50/14 |
| | | | | 340/576 |

(Continued)

FOREIGN PATENT DOCUMENTS

JP 2017-102401 A 6/2017

*Primary Examiner* — Tyler J Lee
(74) *Attorney, Agent, or Firm* — Rimon P.C.

(57) ABSTRACT

A vehicle content presentation control system provides, in conjunction with a content providing system that provides content to an occupant on a vehicle, a presentation of the content to the occupant. The vehicle content presentation control system: executes authentication based on a license key; switches between a self-traveling mode that allows for self-traveling of the vehicle, and a presentation control mode of providing the presentation of the content to the occupant; and, when the vehicle content presentation control system is authenticated by using an authorized license key in the authentication, and presentation control data regarding the presentation and transmitted from the content providing system is received during the presentation control mode, controls one or both of a vehicle traveling related device related to traveling of the vehicle and a vehicle device installed in the vehicle, in accordance with the presentation control data.

14 Claims, 10 Drawing Sheets

(56) References Cited

U.S. PATENT DOCUMENTS

| | | | |
|---|---|---|---|
| 2015/0338852 A1* | 11/2015 | Ramanujam | G01C 21/26 |
| | | | 701/2 |
| 2016/0127334 A1* | 5/2016 | Bangole | H04L 67/12 |
| | | | 713/171 |
| 2016/0127895 A1* | 5/2016 | Bangole | H04W 4/48 |
| | | | 380/279 |
| 2016/0311323 A1* | 10/2016 | Lee | B60K 35/28 |
| 2017/0021765 A1* | 1/2017 | Mori | B60Q 9/00 |
| 2020/0380257 A1* | 12/2020 | He | G06V 20/64 |
| 2022/0272084 A1* | 8/2022 | Hyatt | H04W 4/70 |
| 2022/0340166 A1* | 10/2022 | Kume | B60W 50/14 |
| 2022/0347567 A1* | 11/2022 | Lake-Schaal | H04W 4/08 |
| 2023/0001948 A1* | 1/2023 | Hayashi | B60W 40/08 |
| 2023/0013492 A1* | 1/2023 | Kume | B60W 50/14 |
| 2023/0019934 A1* | 1/2023 | Kume | B60K 35/10 |

* cited by examiner

VEHICLE CONTENT PRESENTATION CONTROL SYSTEM, VEHICLE, AND NON-TRANSITORY RECORDING MEDIUM

CROSS-REFERENCE TO RELATED APPLICATIONS

The present application claims priority from Japanese Patent Application No. 2023-039671 filed on Mar. 14, 2023, the entire contents of which are hereby incorporated by reference.

BACKGROUND

The disclosure relates to a vehicle content presentation control system, a vehicle, and a non-transitory recording medium.

In recent years, for example, experience-based entertainment systems installed in theme parks provide virtual reality (VR) content with a higher realism of virtual space, by presenting video and a sense of movement at the same time.

In addition, drive-in theater (car theater) facilities have been commonly used that make it possible to watch, for example, movies while being on board a vehicle.

As described above, vehicles have recently been often used not only as a transportation, but also as some apparatuses for viewing and/or listening of or experiencing of entertainment content.

For example, to use a vehicle for viewing and/or listening of or experiencing of content, a recently known system drives a portion of a vehicle in conjunction with content such as a movie or video. For example, reference is made to Japanese Unexamined Patent Application Publication (JP-A) No. 2017-102401.

SUMMARY

An aspect of the disclosure provides a vehicle content presentation control system configured to, in conjunction with a content providing system that provides content for viewing and/or listening to an occupant on board a vehicle, provide a presentation of the content to the occupant. The vehicle content presentation control system includes one or more processors and one or more memories. The one or more memories are communicably coupled to the one or more processors. The one or more processors are configured to: execute an authentication process based on a license key; execute a switching control process of switching between a self-traveling mode that allows for self-traveling of the vehicle, and a presentation control mode of providing the presentation of the content to the occupant; and, when the vehicle content presentation control system is authenticated by using an authorized license key in the authentication process, and presentation control data regarding the presentation and transmitted from the content providing system is received during the presentation control mode, control one or both of a vehicle traveling related device related to traveling of the vehicle and a vehicle device installed in the vehicle, in accordance with the presentation control data or a progress status of the content based on the presentation control data.

An aspect of the disclosure provides a vehicle content presentation control system configured to, in conjunction with a content providing system that provides content for viewing and/or listening to an occupant on board a vehicle, provide a presentation of the content to the occupant. The vehicle content presentation control system includes a connector, one or more processors, and one or more memories. The connector is configured to allow for physically and electrically detachable connection of the vehicle content presentation control system to one or both of a vehicle traveling related device related to traveling of the vehicle and a vehicle device installed in the vehicle. The one or more memories are communicably coupled to the one or more processors. The one or more processors are configured to: execute an authentication process based on a license key; execute a switching control process of switching between a self-traveling mode that allows for self-traveling of the vehicle, and a presentation control mode of providing the presentation of the content to the occupant; and, when presentation control data regarding the presentation and transmitted from the content providing system is received during the presentation control mode, and the vehicle content presentation control system is authenticated by using an authorized license key in the authentication process and is coupled to one or both of the vehicle traveling related device and the vehicle device via the connector, control one or both of the vehicle traveling related device related to the traveling of the vehicle and the vehicle device installed in the vehicle, in accordance with the presentation control data or a progress status of the content based on the presentation control data.

An aspect of the disclosure provides a non-transitory computer readable recording medium containing a program to be applied to a computer configured to, in conjunction with a content providing system that provides content for viewing and/or listening to an occupant on board a vehicle, provide a presentation of the content to the occupant. The computer includes one or more processors and one or more memories. The one or more memories are communicably coupled to the one or more processors. The program causes, when executed by the computer, the computer to implement a method. The method includes: executing authentication based on a license key; switching between a self-traveling mode that allows for self-traveling of the vehicle, and a presentation control mode of providing the presentation of the content to the occupant; and, when the computer is authenticated by using an authorized license key in the authentication, and presentation control data regarding the presentation and transmitted from the content providing system is received during the presentation control mode, controlling one or both of a vehicle traveling related device related to traveling of the vehicle and a vehicle device installed in the vehicle, in accordance with the presentation control data or a progress status of the content based on the presentation control data.

An aspect of the disclosure provides a non-transitory computer readable recording medium containing a program to be applied to a computer configured to, in conjunction with a content providing system that provides content for viewing and/or listening to an occupant on board a vehicle, provide a presentation of the content to the occupant. The computer includes a connector, one or more processors, and one or more memories. The connector is configured to allow for physically and electrically detachable connection of the computer to one or both of a vehicle traveling related device related to traveling of the vehicle and a vehicle device installed in the vehicle. The one or more memories are communicably coupled to the one or more processors. The program causes, when executed by the computer, the computer to implement a method. The method includes: executing authentication based on a license key; switching between a self-traveling mode that allows for self-traveling of the vehicle, and a presentation control mode of providing the presentation of the content to the occupant; and, when presentation control data regarding the presentation and transmitted from the content providing system is received during the presentation control mode, and the computer is authenticated by using an authorized license key in the authentication and is coupled to one or both of the vehicle traveling related device and the vehicle device via the connector, controlling one or both of the vehicle traveling related device related to the traveling of the vehicle and the vehicle device installed in the vehicle, in accordance with the presentation control data or a progress status of the content based on the presentation control data.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
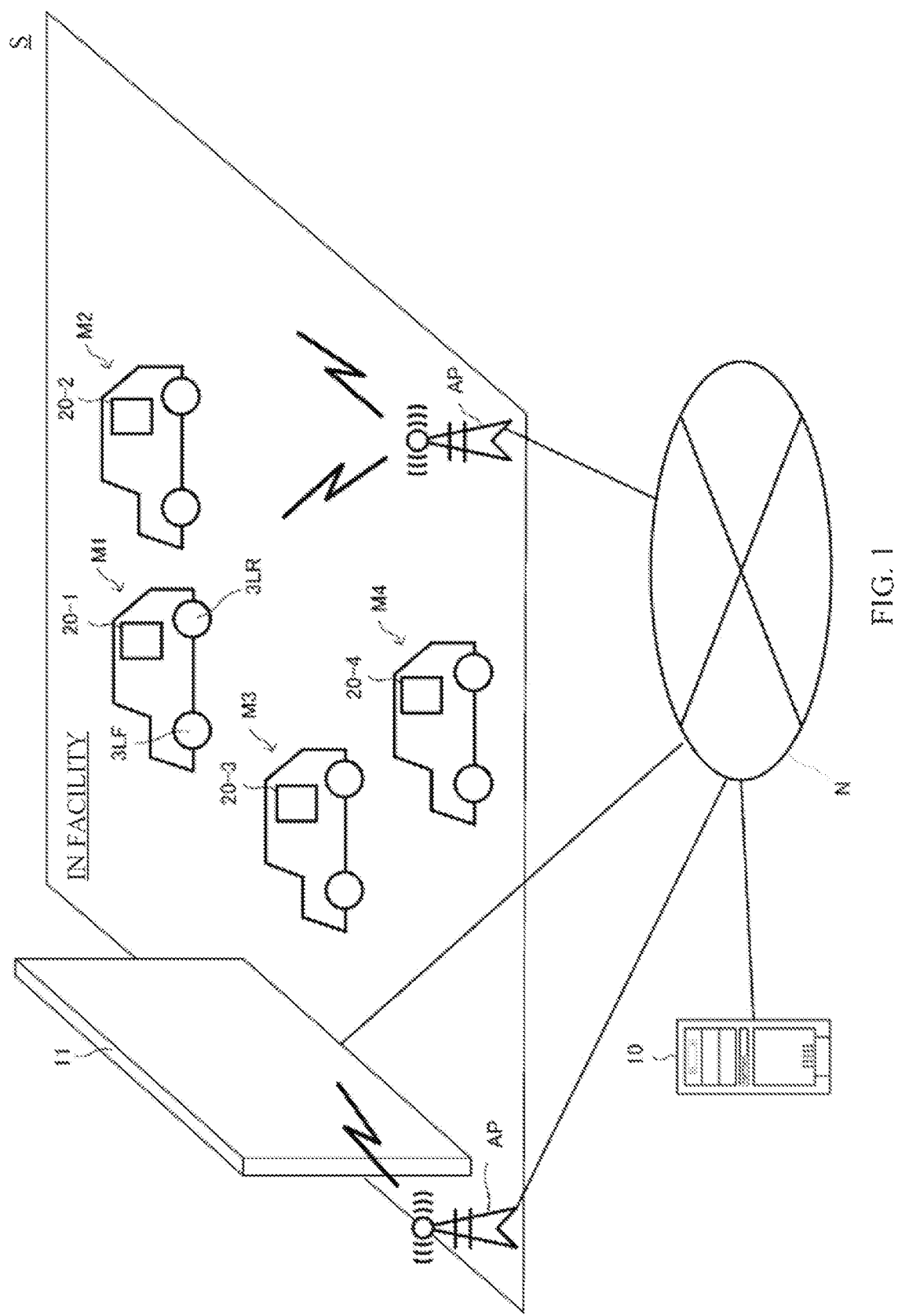
FIG. 1 is a system configuration diagram illustrating an example of a configuration of a content playing system according to one example embodiment of the disclosure.

A system disclosed in JP-A No. 2017-102401 is intended to use a vehicle for viewing and/or listening of or experiencing of content in conjunction with a VR system worn by an occupant, and is not used for a vehicle that is brought by an occupant into, for example, a facility that provides the content.

The system disclosed in JP-A No. 2017-102401 therefore does not assume management of use of a large number of vehicles that arrive at, for example, a facility. It is difficult for the system to change data regarding content and provide a suitable presentation, in accordance with such individual vehicles brought in.

It is desirable to provide a vehicle content presentation control system, a vehicle, and a non-transitory recording medium that make it possible to prevent unauthorized use of content to be provided to a large number of unspecified targets in, for example, a facility.

It is desirable to provide a vehicle content presentation control system, a vehicle, and a non-transitory recording medium that make it possible to provide a viewing and/or listening environment and an experiencing environment suitable for individual vehicles brought into, for example, a facility by occupants.

[A] Example Features of Embodiments of Disclosure (1) A vehicle content presentation control system according to at least one embodiment of the disclosure is configured to, in conjunction with a content providing system that provides content for viewing and/or listening to an occupant on board a vehicle, provide a presentation of the content to the occupant. The vehicle content presentation control system includes:
one or more processors; and
one or more memories communicably coupled to the one or more processors.
The one or more processors are configured to:
execute an authentication process based on a license key;
execute a switching control process of switching between a self-traveling mode that allows for self-traveling of the vehicle, and a presentation control mode of providing the presentation of the content to the occupant; and,
when the vehicle content presentation control system is authenticated by using an authorized license key in the authentication process, and presentation control data regarding the presentation and transmitted from the content providing system is received during the presentation control mode, control one or both of a vehicle traveling related device related to traveling of the vehicle and a vehicle device installed in the vehicle, in accordance with the presentation control data or a progress status of the content based on the presentation control data.

Note that embodiments of the disclosure may be implemented also by a vehicle that executes the processes described above, or a non-transitory recording medium containing a program for execution of the processes described above.

With this configuration, by performing authentication based on a license key, the vehicle content presentation control system, the vehicle, and the non-transitory recording medium according to at least one embodiment of the disclosure make it possible for the content providing system serving as a source that provides content to reliably manage the vehicle as one of a large number of unspecified destinations to which the content is to be provided.

For example, the vehicle content presentation control system, the vehicle, and the non-transitory recording medium according to at least one embodiment of the disclosure make it possible to, in providing a presentation of content to an occupant by using a vehicle brought by the occupant into a facility that provides the content, such as a drive-in theater, reliably manage the vehicle as a destination to which the content is to be provided.

Consequently, the vehicle content presentation control system, the vehicle, and the non-transitory recording medium according to at least one embodiment of the disclosure make it possible to use a vehicle having an occupant on board as an apparatus that allows for viewing and/or listening of or experiencing of content to be provided to a large number of unspecified targets from, for example, a facility, and also make it possible to prevent unauthorized use of the content.

In addition, if it is possible to cause the content providing system to also recognize a vehicle type of a vehicle, for example, as the above-described management in the authentication, the vehicle content presentation control system, the vehicle, and the non-transitory recording medium according to at least one embodiment of the disclosure make it possible to receive presentation control data corresponding to individual vehicles.

Consequently, even for a vehicle brought in by an occupant, the vehicle content presentation control system, the vehicle, and the non-transitory recording medium according to at least one embodiment of the disclosure make it possible to provide a suitable viewing and/or listening environment or experiencing environment to the occupant.

As used herein, the "content for viewing and/or listening" may include, for example, information to be enjoyed by an occupant, such as a movie, music, or a game, including an image, a sound, or both.

The authentication process may refer to an electronic procedure or process of individually recognizing the validity (i.e., authority) to operate in conjunction with the content providing system for each occupant or each vehicle.

For example, the authentication process may include at least authentication using a license key, such as authentication by comparison with a license key registered in the content providing system. The authentication process may include additional authentication such as a password or two-step authentication, in addition to the license key.

In addition, for example, the authentication process may be authentication using a compact device, such as a dongle, holding a license key, or authentication based on input of, for example, a license key by an occupant.

The "self-traveling mode" may be a mode that allows a vehicle to travel, for example, by a driver driving the vehicle or by automated driving. The "self-traveling mode" may use each device such as the vehicle traveling related device for inherent traveling of the vehicle.

The "presentation control mode" may be a mode that, for example, in a self-traveling incapable state, uses each device such as the vehicle traveling related device to provide content to an occupant including the driver.

The "presentation control data" may be, for example, data to be used to control the vehicle traveling related device, the vehicle device, or both, in accordance with the progress status of content involving providing of an image (a moving image or a still image), a sound, or both.

The "vehicle traveling related device" may include devices to be used for inherent traveling of a vehicle, including a motor, a suspension, an electric power steering, and a brake device. The motor may drive the vehicle, i.e., cause the vehicle to travel.

The "vehicle device" may include various devices installed in a vehicle, including, for example, an air conditioner, a seat heater, a steering wheel heater, an audio system, a navigation system, a power seat, a power window, a wiper, a washer, a door lock, an interior light, and lights.

(2) A vehicle content presentation control system according to at least one embodiment of the disclosure is configured to, in conjunction with a content providing system that provides content for viewing and/or listening to an occupant on board a vehicle, provide a presentation of the content to the occupant. The vehicle content presentation control system includes:

a connector configured to allow for physically and electrically detachable connection of the vehicle content presentation control system to one or both of a vehicle traveling related device related to traveling of the vehicle and a vehicle device installed in the vehicle;

one or more processors; and one or more memories communicably coupled to the one or more processors.

The one or more processors are configured to:

execute an authentication process based on a license key;

execute a switching control process of switching between a self-traveling mode that allows for self-traveling of the vehicle, and a presentation control mode of providing the presentation of the content to the occupant; and, when presentation control data regarding the presentation and transmitted from the content providing system is received during the presentation control mode, and the vehicle content presentation control system is authenticated by using an authorized license key in the authentication process and is coupled to one or both of the vehicle traveling related device and the vehicle device via the connector, control one or both of the vehicle traveling related device related to the traveling of the vehicle and the vehicle device installed in the vehicle, in accordance with the presentation control data or a progress status of the content based on the presentation control data.

With this configuration, even if a vehicle is not configured to receive presentation control data, the vehicle content presentation control system according to at least one embodiment of the disclosure makes it possible to use the presentation control data, in addition to the example effects described above.

Consequently, the vehicle content presentation control system according to at least one embodiment of the disclosure makes it possible to use a vehicle having an occupant on board as an apparatus that allows for viewing and/or listening of or experiencing of content to be provided to a large number of unspecified targets from, for example, a facility, and also makes it possible to prevent unauthorized use of the content.

In addition, even for a vehicle that is not configured to receive presentation control data and is brought in by an occupant, the vehicle content presentation control system according to at least one embodiment of the disclosure makes it possible to provide a suitable viewing and/or listening environment or experiencing environment to the occupant.

(3) In some embodiments, the vehicle content presentation control system may further include a compact-device attachment and detachment part to and from which a compact device holding a license key is physically attachable and detachable. The compact-device attachment and detachment part may be configured to allow the compact device to be electrically coupled thereto.

When the compact device holding an authorized license key is attached to the compact-device attachment and detachment part, the one or more processors may be configured to perform, as the authentication process, authentication assuming that the vehicle content presentation control system has the authorized license key.

With this configuration, in some embodiments, it is possible to perform authentication by attaching a compact device, and, for example, an occupant's operation and a communication operation for authentication are thus unnecessary, which facilitates authentication.

(4) In some embodiments, the one or more processors may be configured to:
when the presentation control data regarding the presentation and transmitted from the content providing system is received during the presentation control mode, and the vehicle content presentation control system is authenticated by using the authorized license key in the authentication process,
control one or both of the vehicle traveling related device and the vehicle device, in accordance with the progress status of the content based on the presentation control data.

With this configuration, the vehicle content presentation control system according to some embodiments makes it is possible to provide a content presentation control to all vehicles by using the same data.

Consequently, the vehicle content presentation control system according to some embodiments makes it unnecessary to perform bothersome processing or complicated processing in the content providing system, which makes it possible to simplify data communication with the content providing system.

[B] Details of Example Embodiments of Disclosure

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis.

The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

[B1] First Example Embodiment

[B1.1] Content Playing System

First, description is given of an overview of a content playing system S using vehicles M (e.g., vehicles M1, M2, M3, M4, etc.), as a first example embodiment of the disclosure, with reference to FIG. 1.

FIG. 1 is a system configuration diagram illustrating an example of a configuration of the content playing system S according to the example embodiment.

FIG. 1 illustrates some of the vehicles M to simplify the drawing. In other words, the actual content playing system S may involve a larger number of vehicles M than those illustrated in FIG. 1.

<Overview of System>

As illustrated in FIG. 1, the content playing system S according to the example embodiment may be, for example, a system that plays content, such as a movie or a game, for an occupant accommodated as a user together with the vehicle M in a recreational facility, such as a drive-in theater or an amusement facility. In one embodiment, the content playing system S may serve as "content providing system".

For example, the content playing system S according to the example embodiment may use the vehicle M brought into the recreational facility from outside the facility by a user, as an apparatus that allows for viewing and/or listening of or experiencing of content to be provided to a large number of unspecified targets. The vehicle M may be a vehicle owned by the user or a vehicle borrowed from another person.

The content playing system S according to the example embodiment may be configured to achieve a suitable viewing and/or listening environment or a suitable experiencing environment, even for vehicles of different manufacturers or different vehicle types that are brought in from outside the facility.

In addition, under such an environment, the content playing system S may be configured to, for example, allow a user to view and/or listen to content additionally including experience-based presentation effects as well as sounds and images. Such content may be intended for, for example, a 4D theater, or an amusement apparatus with presentation effects like an experience-based attraction.

In one example, the content playing system S may include a display device 11 and a management server 10. The display device 11 may display content for viewing and/or listening. The management server 10 may provide data regarding the content for viewing and/or listening to the display device 11 and the vehicle M, and manage the vehicle M.

The content playing system S may include content presentation control systems 20 (e.g., content presentation control systems 20-1, 20-2, 20-3, 20-4, etc.) that are mounted on the respective vehicles M. The content presentation control system 20 may perform a presentation control regarding content displayed on the display device 11, based on data regarding presentation of the content. The data regarding presentation of the content may hereinafter be referred to as "presentation control data". In one embodiment, the content presentation control system 20 may serve as a "vehicle content presentation control system".

<Overview of Configuration>

The management server 10 may be a data processing device that executes various processes that allow a user to view and/or listen to and experience content, such as displaying the content on the display device 11, for example, by using an application programming interface (API) or a predetermined platform.

The management server 10 may include one device and one processor, or multiple devices and multiple processors.

The management server 10 may include a database that holds various pieces of data (in a broad sense, a storage device or a memory). The database may be a storage 170 to be described later.

Note that the management server 10 may access a database (in a broad sense, a storage device or a memory) coupled via a network N. The network N may be, for example, the Internet.

The management server 10 may generate image data based on content data such as a movie or a game, and output the generated image data to the display device 11.

The display device 11 may include a screen and a projector. The screen may be disposed at a position, in the recreational facility, that is viewable from multiple occupants serving as users in a state of being on board the vehicles M. The projector, such as a film projector, may project an image on the screen.

The display device 11 may be configured to project an image of content from the projector onto the screen, based on image data regarding the content provided from the management server 10, such as a movie or a game. The image data regarding the content may hereinafter be simply referred to as "image data".

Note that the display device 11 may include any of various displays, such as a liquid crystal display or an organic EL display, instead of the screen and the projector. The display device 11 may have, for example, a large display region.

Each content presentation control system 20 may be coupled to the management server 10 by wireless communication via the network N, such as a local area network, and an access point AP. Each content presentation control system 20 may execute various processes including an authentication process and a presentation control process regarding content, i.e., a content presentation control process.

The content presentation control system 20 may be configured to be dedicated for the content playing system S, or may be configured by a data processing device such as a computer, a smartphone, or a game device.

Each content presentation control system 20 may be configured to execute the authentication process based on a license key, in operating in conjunction with the management server 10, to execute an electronic procedure or process of individually recognizing the validity to operate in conjunction with the management server 10.

Furthermore, each content presentation control system 20 may be configured to control a vehicle traveling related device related to traveling of the vehicle M, a vehicle device installed in the vehicle M, or both, based on presentation control data, in accordance with a progress status of content.

Content for viewing and/or listening in the example embodiment may include, for example, information to be enjoyed by an occupant, such as a movie, music, or a game, including an image, a sound, or both. Note that, in the example embodiment, description is given using a movie as the content for viewing and/or listening, and the "content for viewing and/or listening" may also be referred to as "content", unless otherwise specified.

An authorized license key may be an authentication key indicating that the content presentation control system 20 is a system permitted by the content playing system S to execute presentation related to content.

[B1.2] Management Server

Figure 2:
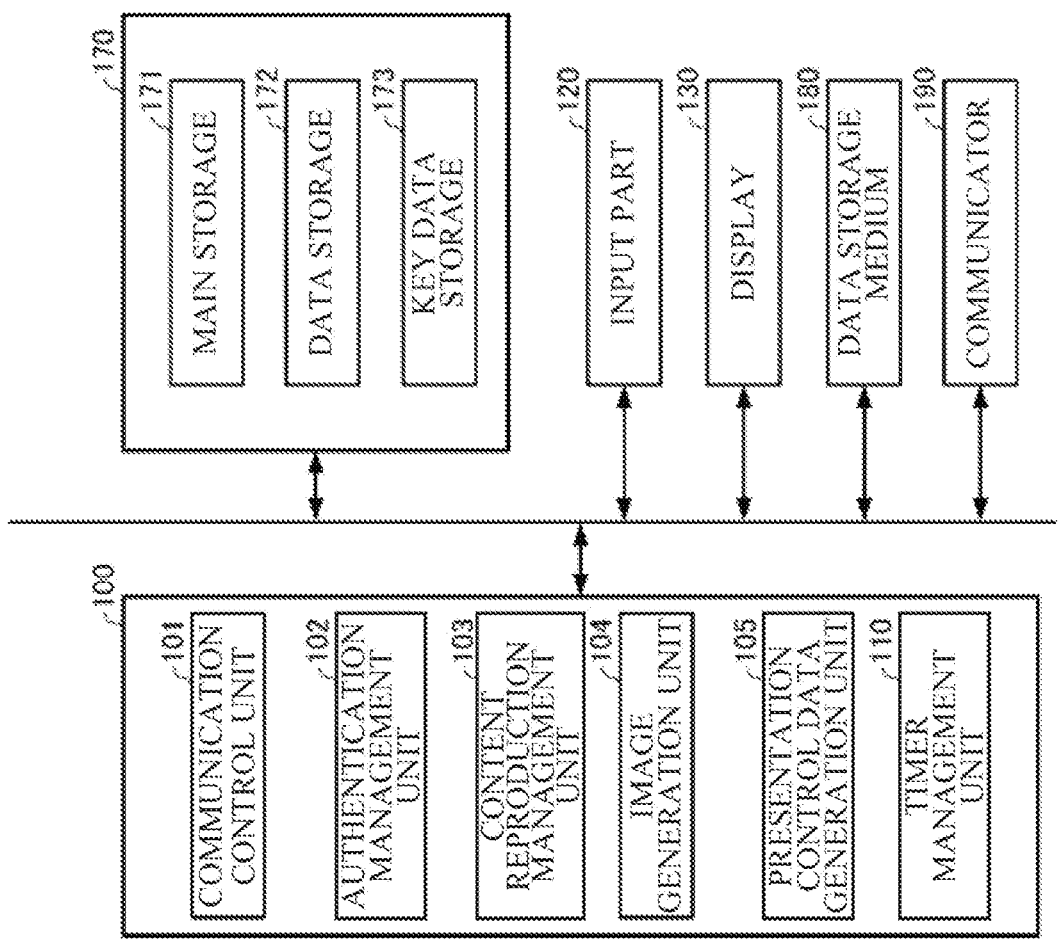
FIG. 2 is a block diagram illustrating an example of a configuration of a management server according to one example embodiment.

Next, description is given of the management server 10 according to the example embodiment, with reference to FIG. 2. FIG. 2 is a block diagram illustrating an example of a configuration of the management server 10 according to the example embodiment.

An input part 120 may be used by a person such as a system administrator for a setting regarding content, other desired settings, and data input. The input part 120 in the example embodiment may include, for example, a mouse or a keyboard.

A display 130 may display an operation screen for the system administrator. The display 130 in the example embodiment may include, for example, a liquid crystal display.

The storage 170 may serve as a work area of, for example, a processor 100. An operation of the storage 170 may be implemented by hardware such as a random access memory (RAM) or a video random access memory (VRAM).

For example, the storage 170 may include a main storage 171, a data storage 172, and a key data storage 173. The main storage 171 may serve as the work area to be used in executing various processes. The data storage 172 may hold content data to be played. The key data storage 173 may hold a list of authenticable license keys.

A data storage medium 180 may be computer-readable. The data storage medium 180 may hold, for example, program and data. For example, the data storage medium 180 may hold a program that causes a computer to serve as each unit in the example embodiment, i.e., a program that causes the computer to execute a process of each unit.

Note that the processor 100 may perform various processes in the example embodiment, based on data read from the program or data held in the data storage medium 180.

For example, the data storage medium 180 may be an optical disk (e.g., a CD or a DVD), a magneto-optical (MO) disk, a magnetic disk, a hard disk, a flash memory such as a solid state drive, a magnetic tape, a memory (e.g., a read only memory (ROM)), or a memory card.

A communicator 190 may perform various controls for communication with the outside (e.g., each content presentation control system 20). An operation of the communicator 190 may be implemented by, for example, hardware such as various processors or a communication application specific integrated circuit (ASIC), or by a program.

The processor 100 may perform various processes in the example embodiment based on the program or data held in the storage 170.

Note that the processor 100 in the example embodiment may read the program and data held in the data storage medium 180, temporarily store the read program and data in the storage 170, and perform processing based on the program and data.

The processor 100 may perform various processes by using the main storage 171 in the storage 170 as the work area. An operation of the processor 100 may be implemented by hardware such as various processors (e.g., a central processing unit (CPU) or a digital signal processor (DSP)), or by a program.

In one example, the processor 100 may include a communication control unit 101, an authentication management unit 102, a content reproduction management unit 103, an image generation unit 104, a presentation control data generation unit 105, and a timer management unit 110.

The communication control unit 101 may establish a communication line with, for example, the content presentation control system 20 via the network N, and perform mutual communication.

The authentication management unit 102 may, in executing the authentication process, receive input data inputted by a user, or key data such as a license key, from each content presentation control system 20. The input data may be a user name, a user ID, a password, or a combination of two or more of these.

The authentication management unit 102 may execute the authentication process for each content presentation control system 20, based on the received input data or key data, and data regarding the list of license keys held in the key data storage 173.

When the content presentation control system 20 is authenticated as an authorized content presentation control system 20, the authentication management unit 102 may permit the presentation control data generation unit 105 to transmit presentation control data.

The content reproduction management unit 103 may, based on an instruction from, for example, the system administrator, read content data such as a movie or a game held in the data storage 172, and output image data included in the read content data to the image generation unit 104.

The content reproduction management unit 103 may also directly output sound data included in the read content data to each content presentation control system 20 via the communication control unit 101 and the communicator 190. The sound data included in the read content data may hereinafter be referred to as "content sound data".

Furthermore, the content reproduction management unit 103 may output presentation effect data included in the read content data to the presentation control data generation unit 105. Examples of the presentation effect data may include a motion of moving a seat, a flash, wind, rain, bubbles, fog, air, mist, a storm, snow, and hot air.

The image generation unit 104 may execute a rendering process based on the image data outputted from the content reproduction management unit 103, generate digital or analog image signals in a predetermined format, and output the generated image signals to the display device 11.

The presentation control data generation unit 105 may, for example, generate data (presentation control data) to be used to drive various vehicle traveling related devices and vehicle devices of each corresponding vehicle M, based on the presentation effect data outputted from the content reproduction management unit 103.

For example, the presentation control data generation unit 105 may generate data or signals that are able to be communicated via a communication bus such as a dedicated line or a controller area network (CAN) in the vehicle M.

The presentation control data generation unit 105 may transmit the generated presentation control data to the various vehicles M, while embedding synchronizing signals that allow execution of presentation to be controlled in accordance with display timings of the image signals generated by the image generation unit 104, under management of the timer management unit 110.

The timer management unit 110 may be configured to measure a current date and time and a period from a predetermined timing. The timer management unit 110 may output, for example, a current time when a predetermined timing arrives.

[B1.3] Vehicle

Figure 3:
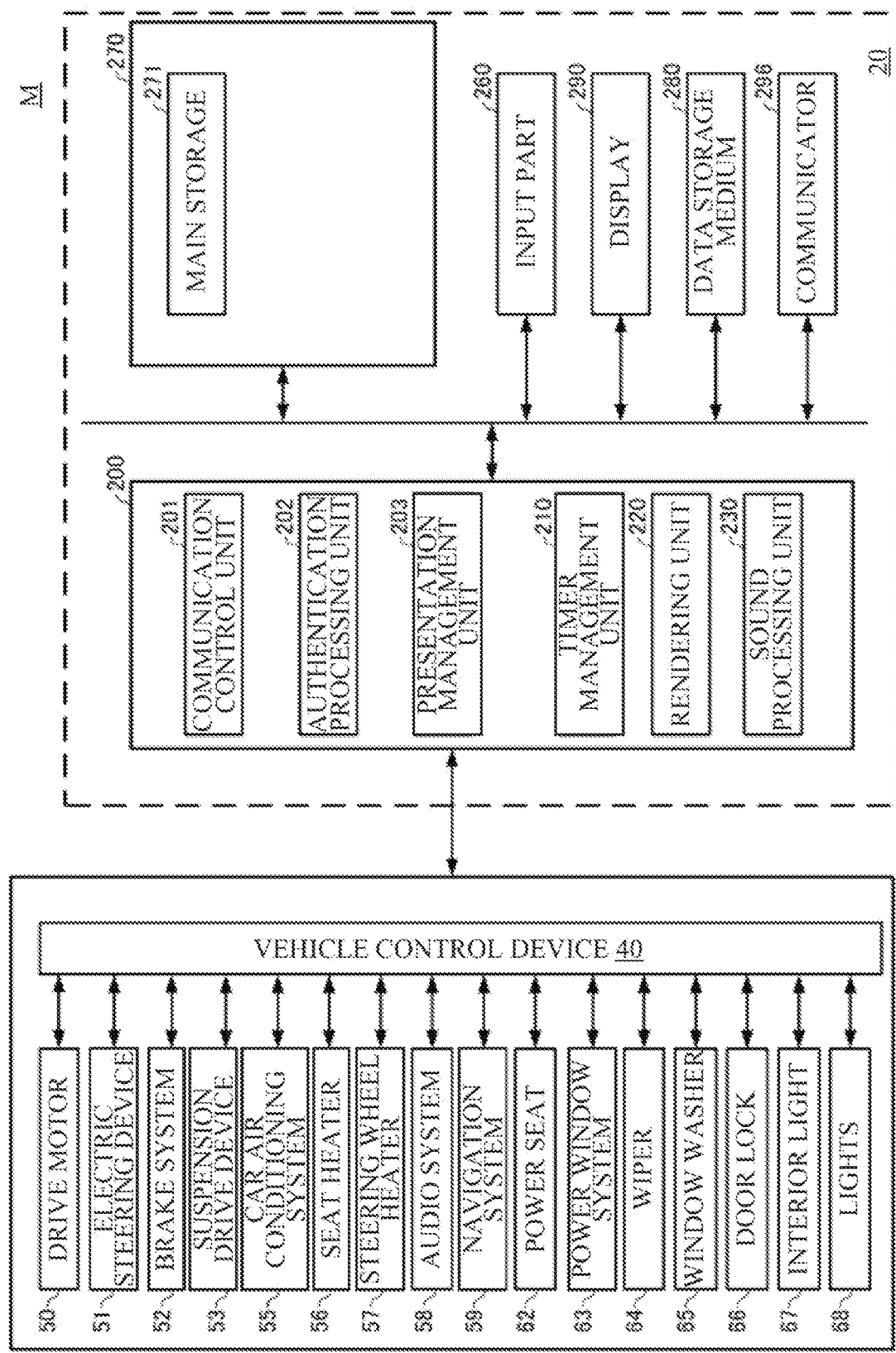
FIG. 3 is a block diagram illustrating an example of a configuration of a content presentation control system and a vehicle equipped with the content presentation control system according to one example embodiment.

Next, description is given of the content presentation control system 20 and the vehicle M equipped with the content presentation control system 20 according to the example embodiment, with reference to FIG. 3.

FIG. 3 is a block diagram illustrating an example of a configuration of the content presentation control system 20 and the vehicle M equipped with the content presentation control system 20 according to the example embodiment.

<Overview of Vehicle M>

The vehicle M may be configured as a four-wheel drive vehicle that transmits driving torque outputted from drive motors 50 to a left front wheel 3LF, a right front wheel 3RF, a left rear wheel 3LR, and a right rear wheel 3RR. The left front wheel 3LF, the right front wheel 3RF, the left rear wheel 3LR, and the right rear wheel 3RR may hereinafter also be collectively referred to as "wheels 3".

The vehicle M may be a vehicle equipped with a secondary battery and a generator. The secondary battery may accumulate electric power. The generator, such as a motor or a fuel cell, may generate electric power to be charged into the battery.

The vehicle M may be an electric vehicle including two drive motors 50, e.g., a front wheel drive motor 50 and a rear wheel drive motor 50, or including drive motors 50 corresponding to the respective wheels 3.

Furthermore, the vehicle M may be used by switching between two modes of a self-traveling mode and a presentation control mode, in accordance with an operation by, for example, a driver who drives the vehicle M. The self-traveling mode may allow the vehicle M to travel in a normal use state. The presentation control mode may put the vehicle M into a self-traveling incapable state and allow an occupant including the driver to view and/or listen to content.

For example, in the self-traveling mode, various vehicle traveling related devices to be used to drive the vehicle M, such as the drive motor 50 or a brake system 52, may be controlled, in accordance with driving by the driver or based on a predetermined automated driving control.

In the presentation control mode, to allow the occupant including the driver to enjoy content, the various vehicle traveling related devices may be controlled in conjunction with the management server 10, based on content data transmitted from the management server 10.

Note that the vehicle M may be a vehicle including an internal combustion engine such as a gasoline engine or a diesel engine, as a drive source, or a hybrid electric vehicle including an internal combustion engine and a drive motor.

<Configuration of Vehicle M>

The vehicle M may include, as vehicle traveling related devices, an electric steering device 51, the brake system 52, and a suspension drive device 53 in addition to the drive motor 50 described above, as illustrated in FIG. 3.

The vehicle M may also include, as vehicle devices, various devices installed in the vehicle M, including a car air conditioning system 55, a seat heater 56, a steering wheel heater 57, an audio system 58, and a navigation system 59, as illustrated in FIG. 3.

Furthermore, the vehicle M may include, as vehicle devices, various devices installed in the vehicle M, including a power seat 62, a power window system 63, a wiper 64, a window washer 65, a door lock 66, an interior light 67, and lights 68, as illustrated in FIG. 3.

The vehicle M may include a vehicle control device 40 that includes one or more electronic control units (ECUs) and controls the vehicle traveling related devices and the vehicle devices, as illustrated in FIG. 3.

In addition, the vehicle M may be configured to cause the vehicle traveling related devices and the vehicle devices and the management server 10 to operate in conjunction with each other. The management server 10 may provide content for viewing and/or listening to an occupant on board the vehicle M.

For example, the vehicle M may include the content presentation control system 20 to be used to provide a presentation of content to the occupant, to cause the vehicle traveling related devices and the vehicle devices and the management server 10 to operate in conjunction with each other.

Note that a configuration and operation of the content presentation control system 20 according to the example embodiment will be described in detail later.

The electric steering device 51 may include an unillustrated electric motor and an unillustrated gear mechanism. The electric steering device 51 may be controlled by the vehicle control device 40 to adjust steering angles of the left front wheel 3LF and the right front wheel 3RF. Note that the electric steering device 51 may be a hydraulic power steering device.

The brake system 52 may be, for example, a hydraulic brake system. The brake system 52 may adjust hydraulic pressure to be supplied to unillustrated brake calipers provided for the respective wheels 3, to generate braking force.

Note that, when the vehicle M is an electric vehicle or a hybrid electric vehicle, the brake system 52 may be used in combination with regenerative braking by the drive motor 50.

The suspension drive device 53 may perform length adjustment (i.e., changing a vehicle height) or adjustment of amounts of expansion and contraction, on unillustrated suspensions provided between the left front, right front, left rear, and right rear wheels 3 and a vehicle body.

The car air conditioning system 55 may include, for example, an air conditioner compressor, a blower fan, and a condenser fan. The air conditioner compressor may also be referred to as a "compressor". The car air conditioning system 55 may implement operations of air blowing and heating and cooling in a vehicle compartment, based on, for example, an instruction from the driver.

The seat heater 56 may be configured to heat an unillustrated seat such as a driver's seat or a passenger seat, based on, for example, an instruction from the driver.

The steering wheel heater 57 may be configured to heat an unillustrated steering wheel, based on, for example, an instruction from the driver.

The audio system 58 may include, for example, a monitor, a radio tuner, a television tuner, a CD player, an amplifier, or a speaker. The audio system 58 may be configured to perform a short-range wireless communication operation. The audio system 58 may perform, based on for example, an instruction from the driver, a sound output control and a display control including a CD reproduction control and a radio or television reception control.

The navigation system 59 may be configured to provide a map or a route to a specific destination by display or sound output to, for example, the driver, in conjunction with the audio system 58.

Note that the audio system 58 and the navigation system 59 may be one system.

The vehicle control device 40 may, based on, for example, the driver's operation, control the electric steering device 51 to control the steering angles of the steered wheels, control the brake system 52 to control the braking force for the vehicle M, and control the suspension drive device 53 to control the lengths or the amounts of expansion and contraction of the suspensions.

In addition, the vehicle control device 40 may, based on the driver's operation or detection by a predetermined sensor, control the car air conditioning system 55 to control air conditioning such as air blowing or heating and cooling in the vehicle compartment, and control the seat heater 56 and the steering wheel heater 57 to control a heating operation of heating a specific portion.

Furthermore, the vehicle control device 40 may perform, on the audio system 58 and the navigation system 59, a startup control and an end control, a control of operation in conjunction during the automated driving control, and the display control or the sound output control.

Note that, in addition to the above devices, the vehicle M may include unillustrated devices including, for example, a vehicle body behavior measurement device, a vehicle surrounding situation detection device, a weather data detection device, and a vehicle position data detection device.

[B1.4] Content Presentation Control System

Next, description is given of the content presentation control system 20 according to the example embodiment, with reference to FIG. 3 described above.

An input part 260 may be a device that accepts input data inputted by a user such as an occupant. The input part 260 may be configured to output the user's input data to a processor 200.

The input part 260 in the example embodiment may include a detector that detects the user's input data or input signal.

For example, the input part 260 may include a lever, a button, the steering wheel, a microphone, a touch panel display, a keyboard, or a mouse.

A storage 270 may serve as a work area of, for example, the processor 200 and a communicator 296. An operation of the storage 270 may be implemented by, for example, a RAM or a video random access memory (VRAM).

The storage 270 in the example embodiment may include a main storage 271 to be used as the work area.

Note that the storage 270 may hold a program or data intended to operate a computer and held in the data storage medium 180 or the storage 170 in the management server 10. The program or data may be received via a network.

A data storage medium 280 may be a computer-readable medium and may hold, for example, a program and data. An operation of the data storage medium 280 may be implemented by, for example, an optical disk (e.g., a CD or a DVD), a magneto-optical (MO) disk, a magnetic disk, a hard disk, a magnetic tape, or a memory (e.g., a ROM).

The data storage medium 280 may hold a program that causes a computer to serve as each unit in the example embodiment, i.e., a program that causes the computer to execute a process of each unit.

Note that the data storage medium 280 may hold a program or data intended to operate a computer and held in the data storage medium 180 or the storage 170 in the management server 10. The program or data may be received via a network.

A display 290 may be implemented by, for example, a cathode ray tube (CRT), a liquid crystal display (LCD), a touch panel display, or a head-mounted display (HMD). Note that the display 290 may be a display included in the audio system 58 and the navigation system 59.

The communicator 296 may perform various controls for communication with the outside (e.g., the management server 10). An operation of the communicator 296 may be implemented by, for example, hardware such as various processors or a communication ASIC, or by a program.

The processor 200 may perform various processes in the example embodiment based on the program or data held in the data storage medium 280.

The processor 200 may acquire data to be used to allow the user to view and/or listen to and experience content acquired from the management server 10 via the communicator 296, and perform processes including the authentication process and the presentation control process, based on, for example, the input data from the input part 260 or a program.

In addition, the processor 200 may perform various processes by using the main storage 271 in the storage 270 as the work area. An operation of the processor 200 may be implemented by hardware such as various processors (e.g., a CPU or a DSP), an ASIC (e.g., a gate array), or by a program.

The processor 200 may include a communication control unit 201, an authentication processing unit 202, a presentation management unit 203, a timer management unit 210, a rendering unit 220, and a sound processing unit 230. Note that some of these units may be omitted.

The communication control unit 201 may perform a process of transmitting and receiving various pieces of data, including presentation control data, to and from the management server 10 via the communicator 296.

In addition, the communication control unit 201 may perform, for example, a process of storing data received from the management server 10 in the storage 270, a process of analyzing the received data, and other control processes regarding transmission and reception of data.

The communication control unit 201 may perform a process of storing address data regarding the management server 10 in the data storage medium 280, and managing the address data. The address data may be, for example, an IP address and a port number.

Note that, when input data indicating a start of communication is accepted from the user, the communication control unit 201 may perform communication with the management server 10.

The authentication processing unit 202 may operate in conjunction with the management server 10 and, when the content presentation control system 20 has authorized license, perform management to give permission for a content presentation control.

For example, the authentication processing unit 202 may execute, by using a license key held in the storage 270, the authentication process of determining whether the content presentation control system 20 has authorized license, regarding an inquiry from the management server 10.

The authentication processing unit 202 may report a result of the determination in the authentication process (i.e., whether the content presentation control system 20 has authorized license) to the management server 10.

The presentation management unit 203 may receive presentation control data and content sound data transmitted from the management server 10. When the authentication process is successful, the presentation management unit 203 may manage various presentations based on the received presentation control data, and control output of sounds corresponding to reproduction of the content.

In one example, the presentation management unit 203 may transmit the received presentation control data to the vehicle control device 40, and output the received content sound data to the audio system 58, while achieving synchronization with the content being reproduced based on the timer management unit 210.

The timer management unit 210 may be configured to measure a current date and time and a period from a predetermined timing. The timer management unit 210 may output, for example, a current time when a predetermined timing arrives.

The rendering unit 220 may generate a desired image for an operation or for management in executing the content presentation control, and output the image to the audio system 58.

The sound processing unit 230 may perform sound processing based on the content sound data received by the presentation management unit 203, to generate sounds of the content, such as BGM, sound effects, or voice, and perform audio output to the audio system 58.

[B1.5] Content Presentation Control Process According to Example Embodiment

[B1.5.1] Overview

Figure 4:
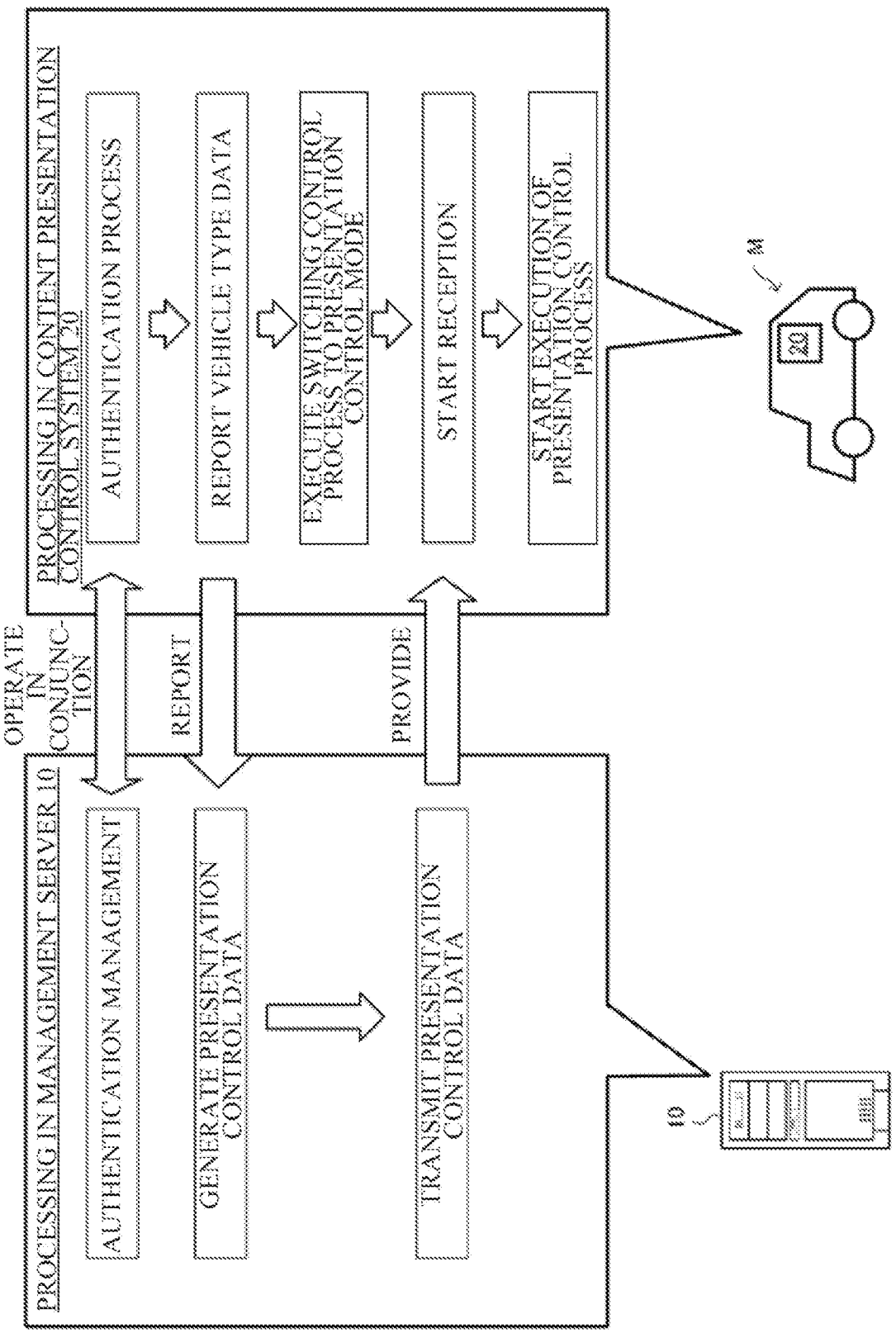
FIG. 4 is a diagram illustrating a content presentation control process to be executed by the content presentation control system according to one example embodiment.

Next, description is given of the content presentation control process including an output control of sounds related to content to be executed by the content presentation control system 20 according to the example embodiment, with reference to FIG. 4. The sound related to the content may hereinafter also be referred to as "content sound".

FIG. 4 is a diagram illustrating the content presentation control process to be executed by the content presentation control system 20 according to the example embodiment.

The content presentation control system 20 according to the example embodiment is configured to, in conjunction with the content playing system S that provides content for viewing and/or listening to an occupant serving as a user on board the vehicle M, provide a presentation of the content to the occupant. Providing the presentation of the content may include the output control of the content sound.

For example, when the vehicle M is brought by an occupant serving as a user into a facility that provides content, the content presentation control system 20 may be configured to allow for reception of presentation control data assuming authentication, and provide the presentation of the content to the appropriate user.

In one example, the content presentation control system 20 may be configured to execute the authentication process based on a license key, under authentication management of the management server 10, as illustrated in FIG. 4.

In addition, upon reporting vehicle type data, the content presentation control system 20 may be configured to execute a switching control process of switching between the self-traveling mode that allows for self-traveling of the vehicle M, and the presentation control mode of providing the presentation of the content to the occupant, as illustrated in FIG. 4.

When the content presentation control system 20 is authenticated by using an authorized license key, and presentation control data is received during the presentation control mode, the content presentation control system 20 is configured to execute the presentation control process of controlling each presentation, in accordance with the presentation control data.

For example, the content presentation control system 20 may be configured to report data regarding the vehicle type of the vehicle M to the management server 10, when authentication is successful, as illustrated in FIG. 4. The data regarding the vehicle type may also be referred to as "vehicle type data".

In addition, upon receiving the vehicle type data, the management server 10 may be configured to generate presentation control data to be used to perform the presentation control in accordance with the vehicle type data, and transmit the generated presentation control data to the content presentation control system 20, as illustrated in FIG. 4.

The content presentation control system 20 may be configured to, as the presentation control process, control one or both of the vehicle traveling related device related to traveling of the vehicle M and the vehicle device installed in the vehicle M, in accordance with the presentation control data, as illustrated in FIG. 4.

With this configuration, by performing authentication based on a license key, the content presentation control system 20 makes it possible for the content playing system S serving as a source that provides content to reliably manage the vehicle M as one of a large number of unspecified destinations to which the content is to be provided.

For example, the content presentation control system 20 makes it possible to, in providing a presentation of content to an occupant by using the vehicle M brought by the occupant into a facility that provides the content, reliably manage the vehicle M as a destination to which the content is to be provided.

Consequently, the content presentation control system 20 makes it possible to use the vehicle M having an occupant on board as an apparatus that allows for viewing and/or listening of or experiencing of content to be provided to a large number of unspecified targets from, for example, a facility, and also makes it possible to prevent unauthorized use of the content.

In addition, if it is possible to cause the content playing system S to also recognize the vehicle type of the vehicle M, for example, as the above-described management in the authentication, the content presentation control system 20 makes it possible to receive presentation control data corresponding to the types of individual vehicles M.

Consequently, even for the vehicle M brought in by an occupant, the content presentation control system 20 makes it possible to provide a suitable viewing and/or listening environment or experiencing environment to the occupant.

[B1.5.2] Presentation Control Data

Next, description is given of the presentation control data in the example embodiment.

The presentation control data may be data generated from presentation effect data included in content data regarding played content for, for example, a MediaMation MX4D (MX4D) system or a 4DX system. The presentation control data may be used to control the various vehicle traveling related devices and vehicle devices in the vehicle M.

In one example, the presentation effect data may be data included in the content data, together with image data and sound data.

The presentation effect data may be data to be used to provide presentation effects including, for example, a motion of moving a seat where a viewing and/or listening user is seated, and a flash (light), wind, rain, bubbles, fog, air, mist, a storm, snow, and hot air in a space where the user is present.

The presentation control data may be generated, from the presentation effect data, as data to be used to control the various vehicle traveling related devices and vehicle devices to provide the presentation effects in the vehicle M.

For example, the presentation control data may be data converted from the presentation effect data and specified for each vehicle type or for each vehicle manufacturer. For example, the presentation control data may be data in a predetermined data format that is able to be communicated in the vehicle M, such as the CAN.

Each presentation control is to be executed in accordance with images of the content to be displayed on the display device 11. Thus, the presentation control data may include synchronizing signals or synchronizing data, and data specifying a presentation control timing such as a timing counted from a start of reproduction.

As an example of the presentation control data, motion data may be generated as data that controls, for example, the motor configured to drive the vehicle M, and the suspension, the electric power steering, and the brake device.

As another example of the presentation control data, air data may be generated as data that causes a predetermined amount of air to be outputted from a predetermined air outlet of the car air conditioning system 55.

Note that the presentation control data may not be generated from the presentation effect data of which corresponding presentation is not providable in the vehicle M, such as bubbles or snow.

In addition, the presentation control data in the example embodiment may be configured in a data format corresponding to another type of communication protocol, such as FlexRay, a local interconnect network (LIN), or media oriented systems transport (MOST).

[B1.5.3] Authentication Process

Next, description is given of the authentication process to be executed by the content presentation control system 20.

The authentication processing unit 202 may execute the authentication process indicating an electronic procedure of individually recognizing the validity (i.e., authority) to operate in conjunction with the content playing system S for each occupant or each vehicle M.

For example, upon accepting a user's operation or upon receiving a request for the authentication process transmitted from the management server 10, the authentication processing unit 202 may execute the authentication process for the content presentation control system 20, under management of the management server 10.

In one example, the authentication processing unit 202 may execute, as the authentication process, a license key determination process of determining whether the content presentation control system 20 has an authorized license key.

When the authentication processing unit 202 determines that the content presentation control system 20 has an authorized license key, the authentication processing unit 202 may assume that authentication has been successful, and permit the presentation management unit 203 to execute various presentations based on presentation control data.

For example, the authentication processing unit 202 may permit the presentation management unit 203 to receive the presentation control data itself, or permit the presentation management unit 203 to control various presentations in a stage of controlling the various presentations based on the received presentation control data.

The authentication processing unit 202 may use a license key registered in the storage 270 in advance, based on the user's operation.

For example, to receive a content viewing and/or listening service provided by the content playing system S, the authentication processing unit 202 may execute a predetermined procedure on, for example, a website by the user's operation in advance, acquire a predetermined license key, and store the license key in the storage 270.

At this time, the authentication processing unit 202 may acquire the license key by performing predetermined registration including, for example, member registration and payment of charge for the content viewing and/or listening service.

In executing the authentication process described above, the authentication processing unit 202 may execute the authentication process by using the license key thus acquired and registered.

Note that the authentication processing unit 202 may execute additional authentication such as a password or two-step authentication, in addition to the authentication process described above.

For example, in comparing the registered license key, the authentication processing unit 202 may execute other authentication such as input of a password or a one-time password, by using a mobile terminal such as a smartphone of the user, and determine whether authentication using the license key is successful.

[B1.5.4] Switching Control Process

Next, description is given of the switching control process between the self-traveling mode and the presentation control mode to be executed by the content presentation control system 20.

The presentation management unit 203 may execute the switching control process of switching between the self-traveling mode that allows for self-traveling of the vehicle M, and the presentation control mode of providing presentation of content to an occupant.

For example, during the presentation control mode, the vehicle M is to be put into the self-traveling incapable state, because the occupant as well as surroundings of the vehicle M can be at risk when the vehicle M is in a traveling state.

Hence, in the example embodiment, to execute the presentation control assuming that the vehicle M is in the self-traveling incapable state, the presentation management unit 203 may execute, in executing the content presentation control process, a mode determination process of determining whether the vehicle M is in the presentation control mode of providing presentation of the content to the occupant.

In one example, the presentation management unit 203 may detect whether the vehicle Mis in the self-traveling incapable state, as the mode determination process.

For example, the presentation management unit 203 may detect, as the self-traveling incapable state, that a shift lever is in a parking range (in a case of an automatic transmission vehicle), that a parking brake is exerting braking force, that the steering wheel is in a locked state, or a combination of these.

When the presentation management unit 203 detects that the vehicle M is in the self-traveling incapable state, the presentation management unit 203 may switch to the presentation control mode. When the presentation management unit 203 determines that the vehicle M is not in the self-traveling incapable state (i.e., is in a self-traveling capable state), the presentation management unit 203 may keep the self-traveling mode.

[B1.5.5] Presentation Control Process

Next, description is given of the presentation control process to be executed by the content presentation control system 20 according to the example embodiment, with reference to FIGS. 5 to 10.

FIGS. 5 to 10 are diagrams illustrating the presentation control process to be executed by the content presentation control system 20 according to the example embodiment.

The presentation management unit 203 may execute the presentation control process, when the content presentation control system 20 is authenticated by using an authorized license key in the authentication process, and presentation control data regarding presentation and transmitted from the content presentation control system 20 is received during the presentation control mode.

In one example, the presentation management unit 203 may execute the authentication process with the management server 10 and, when authentication is successful, report the vehicle type data regarding the vehicle M to the management server 10.

Upon receiving presentation control data including content sound data matching the vehicle type of the own vehicle M, the presentation management unit 203 may output the presentation control data to the vehicle control device 40, and cause the vehicle traveling related device, the vehicle device, or both based on the received presentation control data to execute the presentation control.

For example, the presentation management unit 203 may receive presentation control data having a specific data format in the vehicle M, such as the CAN, of the corresponding vehicle type, and generated from presentation effect data included in content data. The vehicle type may include a drive system. The presentation control data may include content sound data.

The presentation management unit 203 may output the received presentation control data to the vehicle control device 40 in accordance with the presentation control timing, for each presentation type, while achieving synchronization.

For example, the vehicle control device 40 may control the vehicle traveling related device such as the drive motor 50 or the brake system 52, in accordance with the presentation control data, to control a vehicle motion (e.g., yawing, pitching, rolling, bouncing, or vibration).

Figure 5:
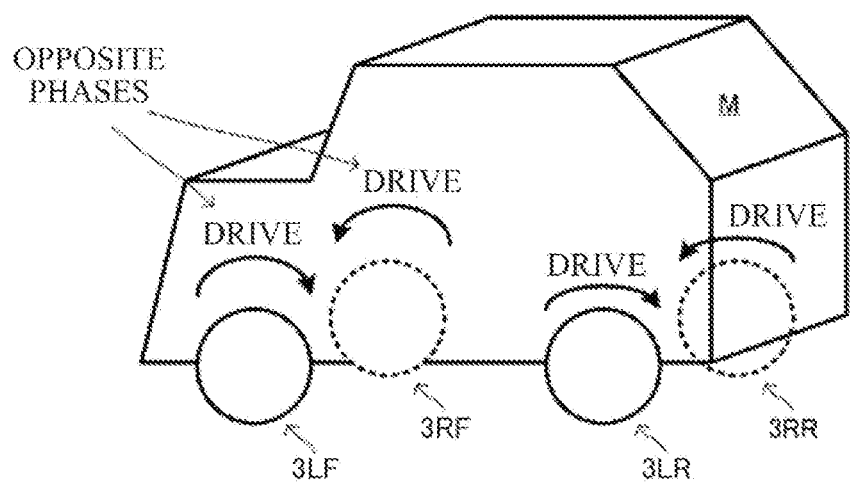
FIG. 5 is a diagram illustrating a presentation control process to be executed by the content presentation control system according to one example embodiment.

When the vehicle M includes four motors and "yawing" is to be provided as the vehicle motion serving as the presentation effect, the presentation management unit 203 may output the presentation control data that drives the right drive wheels 3RF and 3RR and the left drive wheels 3LF and 3LR in opposite phases, as illustrated in FIG. 5.

Figure 6:
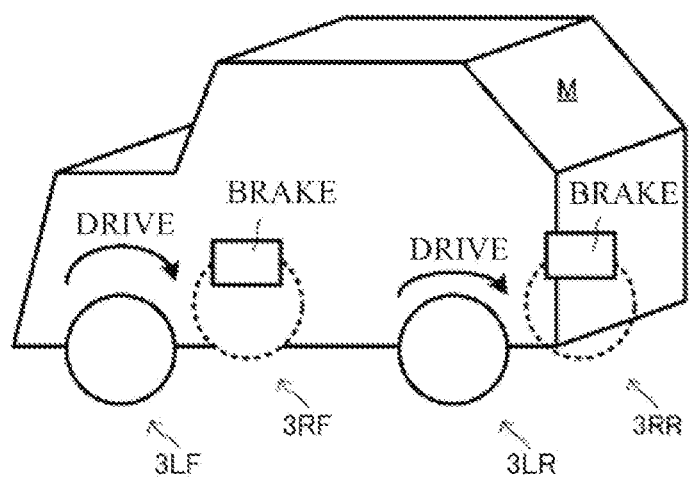
FIG. 6 is a diagram illustrating the presentation control process to be executed by the content presentation control system according to one example embodiment.

Also assumed is a case where the vehicle M includes two motors and "yawing" is to be provided as the vehicle motion serving as the presentation effect. In this case, the presentation management unit 203 may output the presentation control data that applies brakes to the drive wheels 3RF and 3RR on either of the right and left, and drives the drive wheels 3LF and 3LR on the other of the right and left, as illustrated in FIG. 6.

Figure 7:
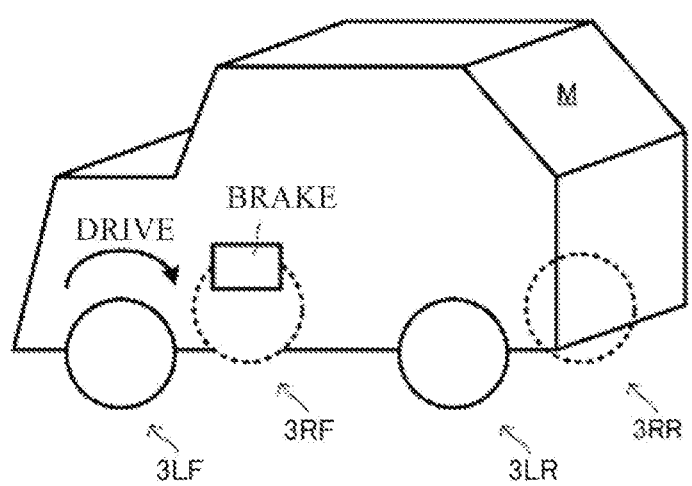
FIG. 7 is a diagram illustrating the presentation control process to be executed by the content presentation control system according to one example embodiment.

Furthermore, when the vehicle M includes one motor and "yawing" is to be provided as the vehicle motion serving as the presentation effect, the presentation management unit 203 may output the presentation control data that applies brakes to the wheel 3RF on either of the right and left, of the drive wheels, and drive the wheel 3LF on the other of the right and left, as illustrated in FIG. 7.

Figure 8:
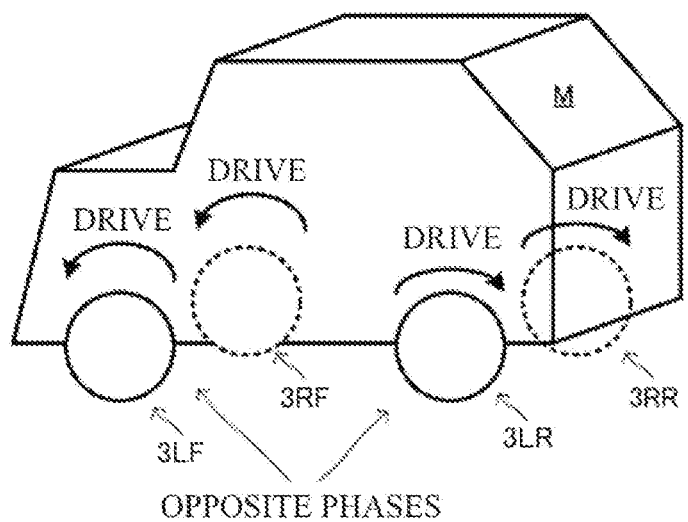
FIG. 8 is a diagram illustrating the presentation control process to be executed by the content presentation control system according to one example embodiment.

When the vehicle M includes four motors or two motors and "bouncing" is to be provided as the vehicle motion serving as the presentation effect, the presentation management unit 203 may output the presentation control data that drives the front wheels 3RF and 3LF and the rear wheels 3RR and 3LR in opposite phases, as illustrated in FIG. 8.

Figure 9:
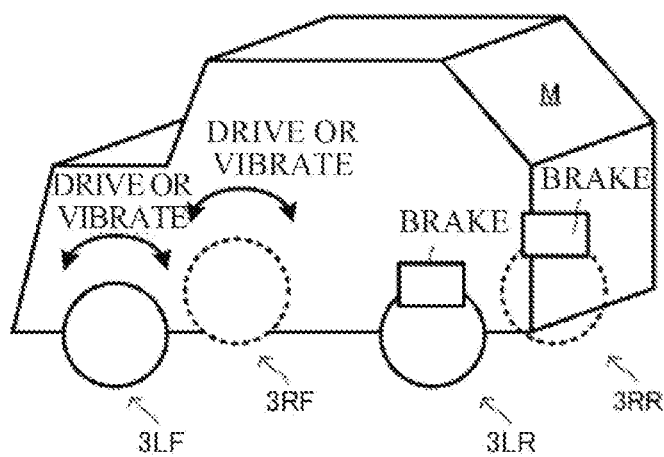
FIG. 9 is a diagram illustrating the presentation control process to be executed by the content presentation control system according to one example embodiment.

Also assumed is a case where the vehicle M includes one motor and "bouncing" is to be provided as the vehicle motion serving as the presentation effect. In this case, the presentation management unit 203 may output the presentation control data that drives the drive wheels 3LF and 3RF to cause pitching (vibration), and applies brakes to the other wheels 3LR and 3RR, as illustrated in FIG. 9.

Note that, in controlling, for example, yawing, pitching, rolling, bouncing, or vibration based on the presentation control data, the presentation management unit 203 may also control a frequency (a timing), an amplitude (a control amount), or both, to execute controls corresponding to various content presentations.

Figure 10:
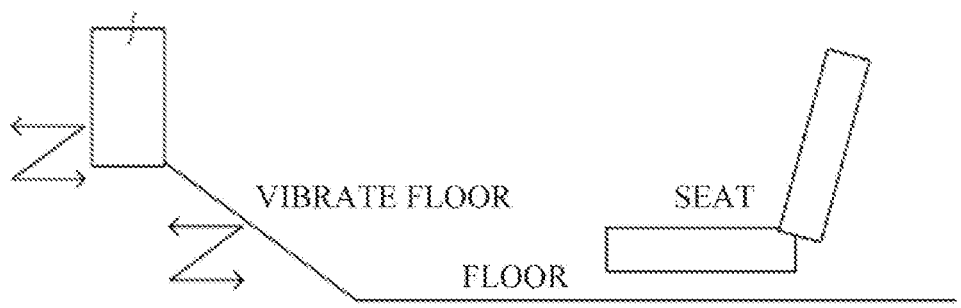
FIG. 10 is a diagram illustrating the presentation control process to be executed by the content presentation control system according to one example embodiment.

As the vibration, the presentation management unit 203 may output the presentation control data that generates, using an electric brake booster, forward and reverse vibration on a floor of the vehicle M, as illustrated in FIG. 10.

In this case, vibrating the floor of the vehicle M makes it possible to provide a presentation of vibration to an occupant.

Furthermore, for example, the vehicle control device 40 may control the vehicle devices, including the car air conditioning system 55 and the audio system 58, to control, for example, a temperature, light (e.g., a timing), air (e.g., a direction and an air volume), and audio. The audio may include surround sound.

[B1.6] Operation According to Example Embodiment

Figure 11:
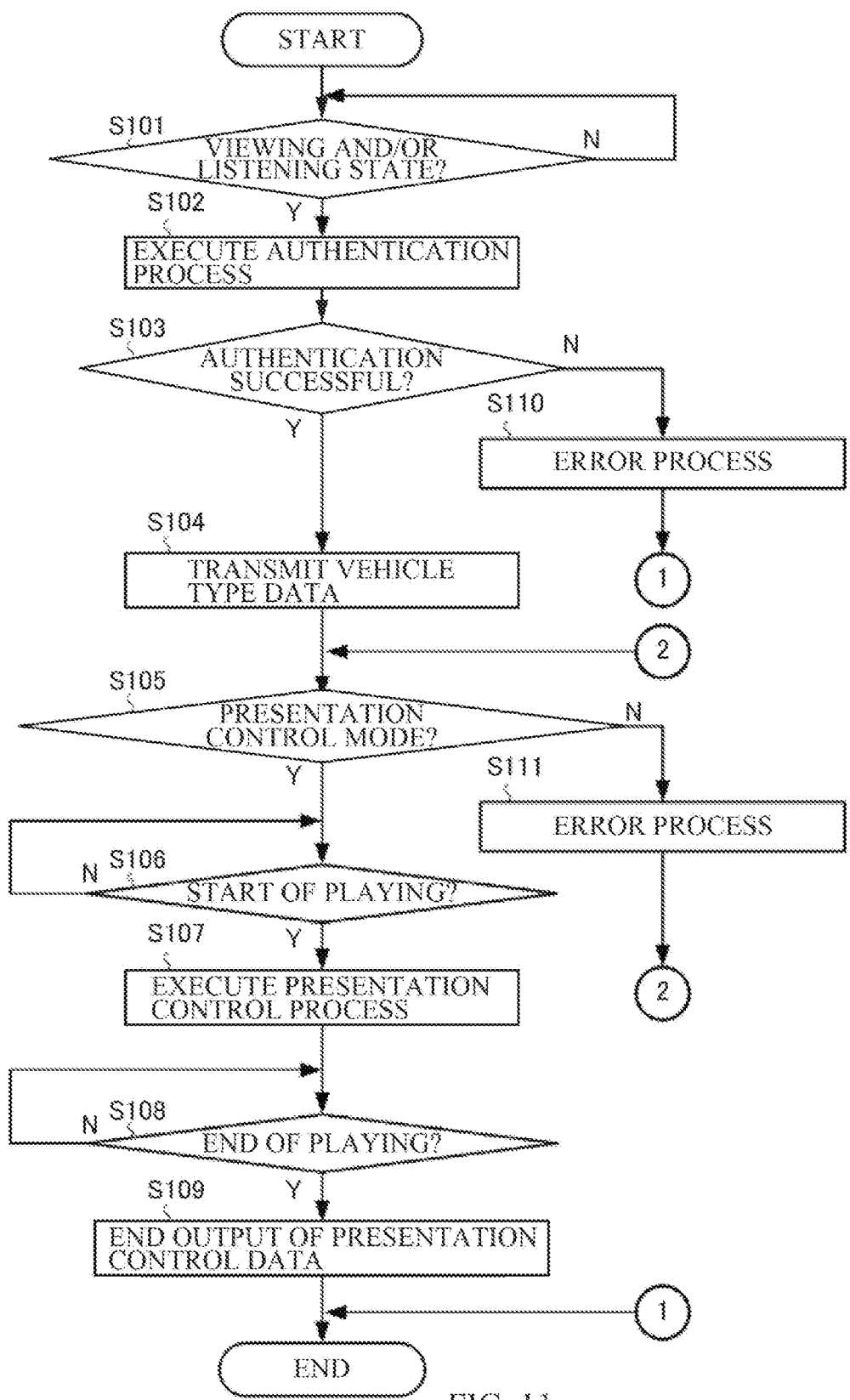
FIG. 11 is a flowchart illustrating operation of the content presentation control process based on presentation control data to be executed by the content presentation control system according to one example embodiment.

Next, description is given of operation of the content presentation control process based on presentation control data to be executed by the content presentation control system 20 according to the example embodiment, with reference to FIG. 11.

FIG. 11 is a flowchart illustrating the operation of the content presentation control process based on the presentation control data to be executed by the content presentation control system 20 according to the example embodiment.

The operation may be a process of allowing, using the vehicle M, a user to view and/or listen to and experience presentation related to content in conjunction with the management server 10.

In the operation, it is assumed that a license key is stored in the storage 270 in advance and that, upon detection of the self-traveling incapable state during the self-traveling mode, the mode is switched to the presentation control mode at the time of the detection.

First, before a start of playing of the content, upon accepting data indicating that the vehicle M has been set to a state of viewing and/or listening to the content to be played, based on an instruction from the user (step S101: Y), the presentation management unit 203 may cause the authentication processing unit 202 to execute the authentication process in conjunction with the management server 10 (step S102).

Thereafter, the authentication processing unit 202 may determine whether an authorized license key has been registered and the authentication process has been successful (step S103).

At this time, if the authentication processing unit 202 determines that an authorized license key has not been registered and the authentication process has been unsuccessful (step S103: N), the authentication processing unit 202 may execute an error process (step S110), and end the operation.

If the authentication processing unit 202 determines that an authorized license key has been registered and the authentication process has been successful (step S103: Y), the presentation management unit 203 may transmit the vehicle type data regarding the vehicle M to the management server 10 (step S104).

Thereafter, the presentation management unit 203 may determine whether the mode has been switched to the presentation control mode of performing a process based on presentation control data regarding the content (step S105).

At this time, if the presentation management unit 203 determines that the mode has been switched to the presentation control mode (step S105: Y), the presentation management unit 203 may cause the process to proceed to step S106.

If the presentation management unit 203 determines that the mode has not been switched to the presentation control mode (step S105: N), the presentation management unit 203 may report an error to the user (step S111), and cause the process to return to step S105.

For example, the presentation management unit 203 may cause the audio system 58 to output, as the error, an image or a sound that prompts switching to the presentation control mode.

Thereafter, upon receiving data indicating that playing of the content has been started (step S106: Y), the presentation management unit 203 may start to output received presentation control data to the vehicle control device 40, and start execution of the presentation control process (step S107).

In one example, based on the received presentation control data, the presentation management unit 203 may output the corresponding presentation control data to the vehicle control device 40 as appropriate in accordance with the presentation control timing, while achieving synchronization.

Thereafter, upon detecting an end of playing of the content (step S108: Y), the presentation management unit 203 may end output of the received presentation control data to the vehicle control device 40 (step S109), and end the operation.

[B1.7] Modification Examples

[B1.7.1] Modification Example 1

Figure 12:
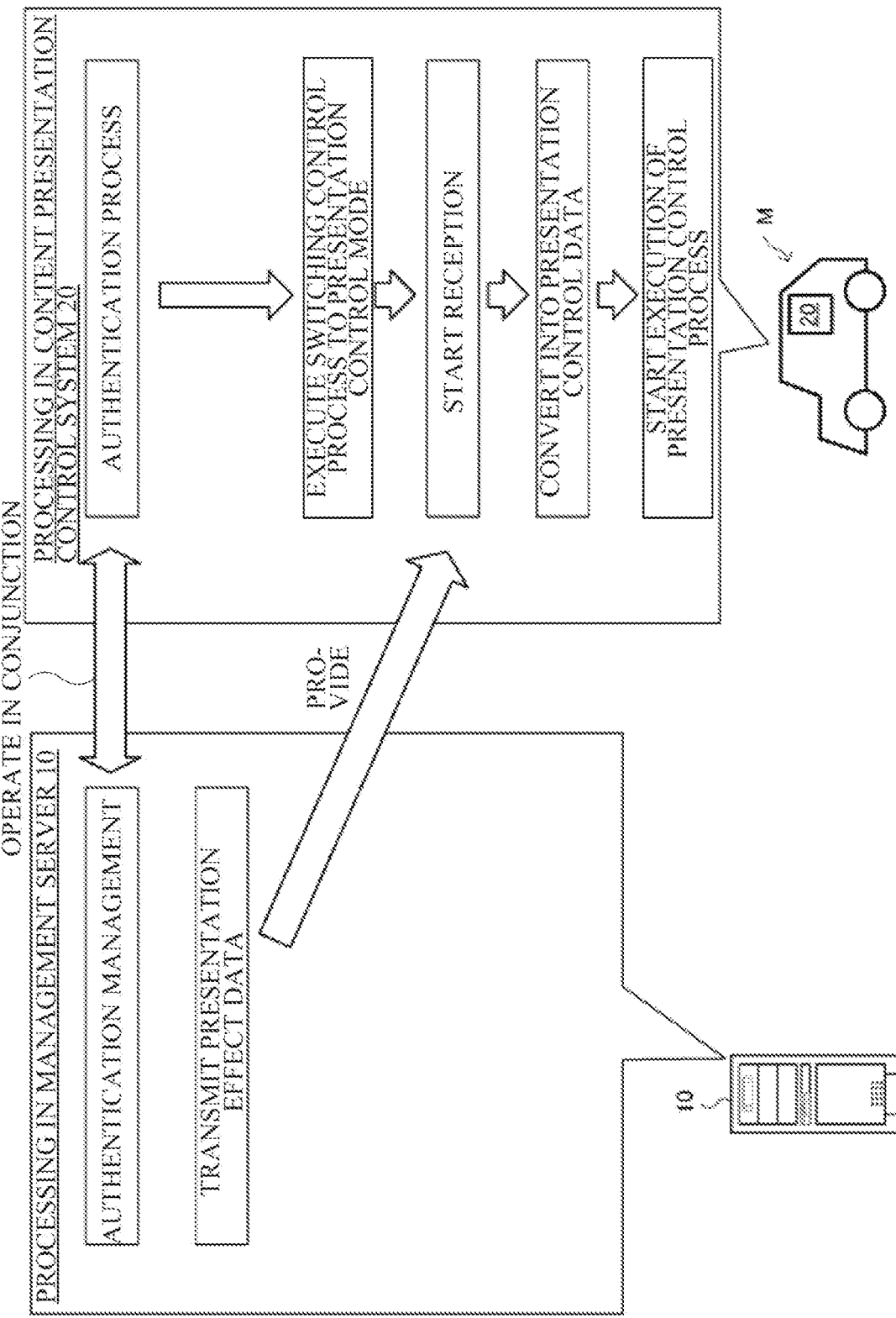
FIG. 12 is a diagram illustrating a modification example of one example embodiment, which is an example in which presentation effect data is converted into presentation control data in the content presentation control system.

Next, description is given of a modification example of the example embodiment described above, which is an example in which presentation effect data included in content data is converted into presentation control data in the content presentation control system 20, with reference to FIG. 12.

FIG. 12 is a diagram illustrating the modification example of the example embodiment described above, which is the example in which the presentation effect data is converted into the presentation control data in the content presentation control system 20.

In Modification Example 1, the content presentation control system 20 may convert the presentation effect data for, for example, the MX4D system or the 4DX system into the presentation control data in a format that is able to be communicated in each type of the vehicle M, such as the CAN.

In other words, the management server 10 according to the example embodiment described above may provide the presentation control data itself in a format that is able to be communicated in each type of the vehicle M, such as the CAN, to the content presentation control system 20.

In contrast, in Modification Example 1, the management server 10 and the content presentation control system 20 may communicate with each other by using the presentation effect data, and the content presentation control system 20 may be configured to convert the presentation effect data into the presentation control data, as illustrated in FIG. 12.

In one example, the content presentation control system 20 may be configured to execute the authentication process based on a license key, under authentication management of the management server 10, as illustrated in FIG. 12.

In addition, when authentication is successful, the content presentation control system 20 may be configured to execute the switching control process of switching between the self-traveling mode that allows for self-traveling of the vehicle M, and the presentation control mode of providing presentation of content to an occupant, as illustrated in FIG. 12.

When authentication is successful, the management server 10 may be configured to transmit the presentation effect data included in the content data to the content presentation control system 20, as illustrated in FIG. 12.

When the content presentation control system 20 is authenticated by using an authorized license key, and the presentation effect data is received during the presentation control mode, the content presentation control system 20 may be configured to execute a data conversion process of converting the presentation effect data into presentation control data appropriate for the vehicle type.

The content presentation control system 20 may be configured to, as the presentation control process, control one or both of the vehicle traveling related device and the vehicle device, in accordance with the converted presentation control data, as illustrated in FIG. 12.

With this configuration, the content presentation control system 20 according to Modification Example 1 makes it possible to provide the content presentation control to all the content presentation control systems 20 by using the same data.

Consequently, the content presentation control system 20 according to Modification Example 1 makes it unnecessary to perform bothersome processing or complicated processing in the management server 10, which makes it possible to simplify data communication between the management server 10 and the content presentation control system 20.

[B1.7.2] Modification Example 2

Figure 13:
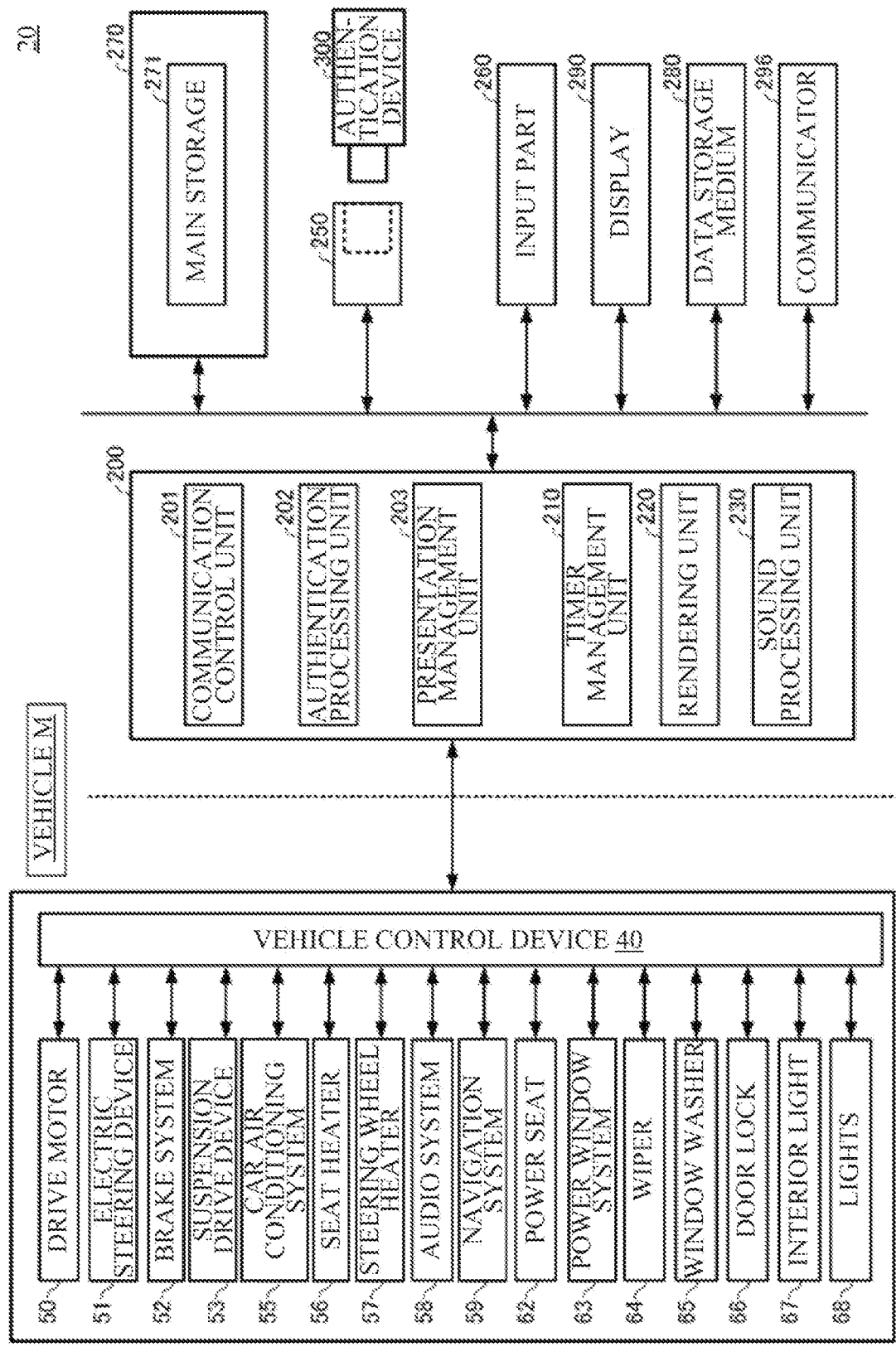
FIG. 13 is a diagram illustrating a modification example of one example embodiment, which is an example in which an authentication process is performed by using an authentication device holding a license key.

Next, description is given of a modification example of the example embodiment described above, which is an example in which the authentication process is performed by using an authentication device holding a license key, with reference to FIG. 13.

FIG. 13 is a diagram illustrating the modification example of the example embodiment described above, which is the example in which the authentication process is performed by using the authentication device holding the license key.

The content presentation control system 20 according to Modification Example 2 may include a dongle connection port 250 in addition to the configuration in the example embodiment described above, as illustrated in FIG. 13. In one embodiment, the dongle connection port 250 may serve as a "compact-device attachment and detachment part".

The dongle connection port 250 may have a socket (what is called a port) to and from which an electronic device configured to receive presentation control data transmitted from the content playing system S is physically and electrically attachable and detachable.

For example, the dongle connection port 250 may have, for example, a port conforming to a given standard such as universal serial bus (USB) or high-definition multimedia interface (HDMI, registered trademark).

To the dongle connection port 250, an authentication device 300 holding an authorized license key may be physically and electrically coupled. In one embodiment, the authentication device 300 may serve as a "compact device".

When the license key is a unique license key matching a license key held in the management server 10, the content presentation control system 20 may assume that the content presentation control system 20 has the authorized license key, and execute the content presentation control process.

In one example, the authentication processing unit 202 may, as the license key determination process, determine whether an authentication device is coupled to the dongle connection port 250, and read the license key held in the authentication device when the authentication device is coupled. The authentication processing unit 202 may transmit the read license key to the management server 10, and compare the license key with the license key already held in the management server 10.

At this time, when the authentication processing unit 202 determines that a license key matching the read license key is held in the management server 10, the authentication processing unit 202 may determine that the content presentation control system 20 has the authorized license key.

[B1.7.3] Modification Example 3

Next, description is given of a modification example of the example embodiment described above, which is an example in which the content presentation control system 20 executes the content presentation control based on a progress status of content.

The content presentation control system 20 according to Modification Example 3 may acquire a progress status of content, instead of presentation control data, generate the presentation control data in accordance with the progress status of the content, and execute the content presentation control process based on the generated presentation control data.

In one example, the presentation management unit 203 may acquire progress status data indicating a scene type such as a scene of flying in the sky, a scene of traveling in dirt, or a scene of walking in a snowstorm in the played content.

The presentation management unit 203 may recognize the progress status of the content based on the acquired progress status data, generate the presentation control data based on the recognized progress status of the content, and provide the generated presentation control data to the vehicle control device 40.

[B2] Second Example Embodiment

[B2.1] Overview

Next, description is given of the content playing system S using the vehicles M, as a second example embodiment of the disclosure.

The vehicle M according to the example embodiment may have a configuration including a connection terminal for connection of the content presentation control system 20 as standard, instead of including the content presentation control system 20 as standard in the first example embodiment.

For example, when the vehicle M does not include the content presentation control system 20 in the first place, the vehicle M according to the example embodiment may be configured to allow the content presentation control system 20 to be attached later. The content presentation control system 20 may be obtained by, for example, rental.

Figure 14:
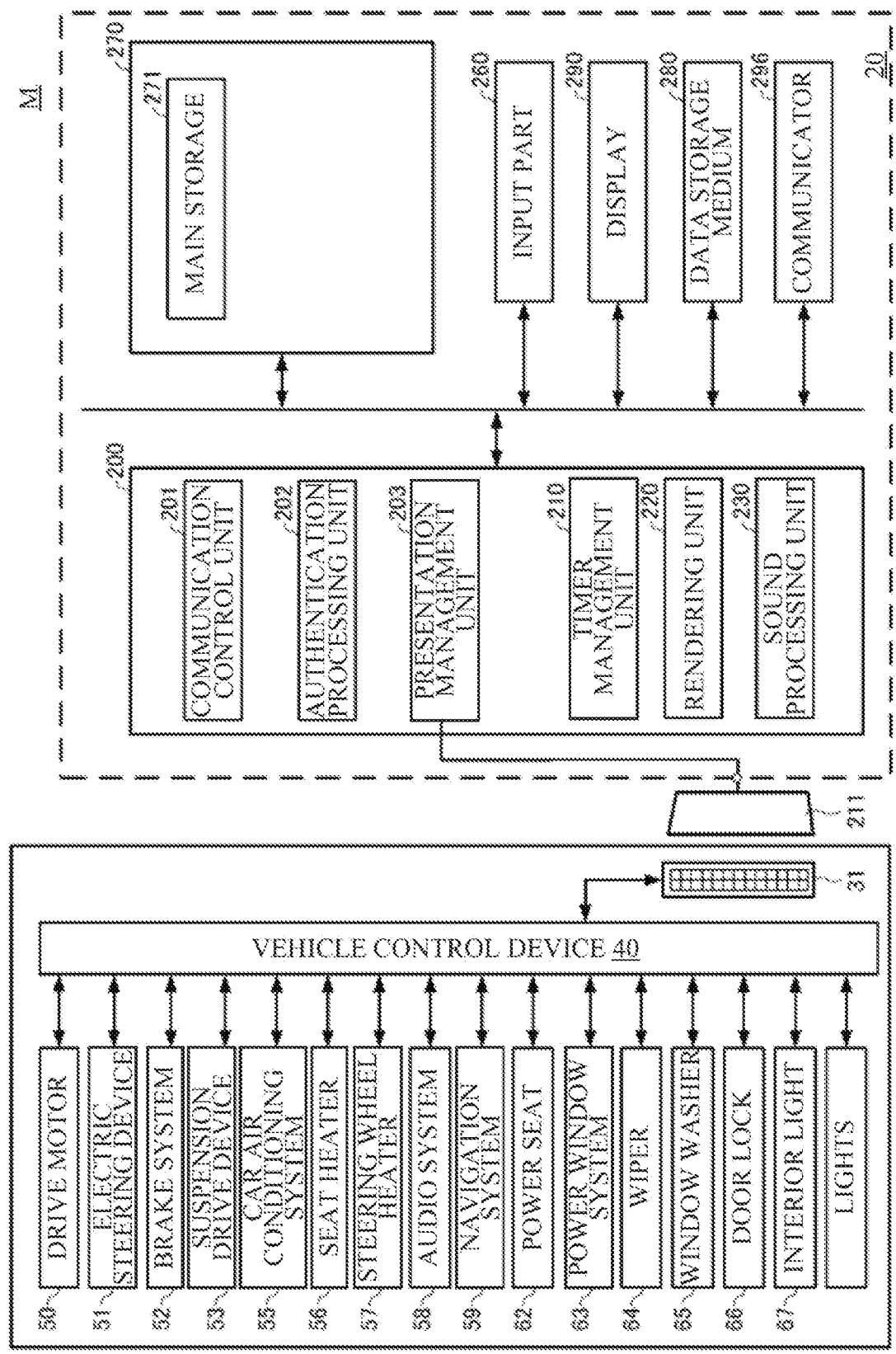
FIG. 14 is a block diagram illustrating an example of a configuration of a content presentation control system and a vehicle equipped with the content presentation control system according to one example embodiment.

In one example, the content presentation control system 20 according to the example embodiment includes a connector 211 for physically and electrically detachable connection to one or both of the vehicle traveling related device and the vehicle device, as illustrated in FIG. 14. The connector 211 may be couplable to a connector 31 of the vehicle M.

In addition, the content presentation control system 20 is configured to execute the authentication process based on a license key, and execute the switching control process of switching between the self-traveling mode that allows for self-traveling of the vehicle M, and the presentation control mode of providing presentation of content to an occupant.

The content presentation control system 20 may be configured to execute the presentation control process, when the content presentation control system 20 is authenticated by using an authorized license key, presentation control data is received during the presentation control mode, and the content presentation control system 20 is coupled to the vehicle traveling related device and the vehicle device.

For example, in such a case, the content presentation control system 20 may be configured to, as the presentation control process, control one or both of the vehicle traveling related device related to traveling of the vehicle M and the vehicle device installed in the vehicle M, in accordance with the presentation control data.

Note that, in the example embodiment, each unit other than the connectors 31 and 211 may have a configuration and an operation similar to those in the first example embodiment. Thus, the same members are denoted with the same reference signs and description thereof is omitted.

[B2.2] Vehicle and Content Presentation Control System

Next, description is given of the vehicle M and the content presentation control system 20 according to the example embodiment, with reference to FIG. 14.

FIG. 14 is a block diagram illustrating an example of a configuration of the content presentation control system 20 and the vehicle M equipped with the content presentation control system 20 according to the example embodiment.

The vehicle M may include the connector 31 that allows for physically and electrically detachable connection to the various vehicle traveling related devices, the various vehicle devices, or both, as illustrated in FIG. 14.

For example, used as the connector 31 may be a terminal communicable with the vehicle control device 40 of the vehicle M by using a predetermined data format such as the CAN for each vehicle type, such as an on-board diagnostics (OBD) terminal.

The presentation management unit 203 may be configured to be coupled to the vehicle control device 40 via the connector 31 and the connector 211, as illustrated in FIG. 14, and transmit the presentation control data to be used to control the vehicle traveling related device and the vehicle device to the vehicle control device 40.

[C] Others

The example embodiments of the disclosure are not limited to those described in the foregoing example embodiments, but various modifications may be made. For example, terms cited as broad or synonymous terms in an item of the description or the drawings may be replaced with broad or synonymous terms in other items of the description or the drawings.

The example embodiments of the disclosure may include the substantially same configurations as the configurations described in the foregoing example embodiments. The substantially same configurations may be, for example, configurations having the same operation, method, and results, or configurations having the same purpose and effects. The example embodiments of the disclosure may include configurations in which non-essential portions of the configurations described in the foregoing example embodiments are replaced. Furthermore, the example embodiments of the disclosure may include a configuration that produces the same workings and effects as the configurations described in the foregoing example embodiments, or a configuration that makes it possible to achieve the same purpose as those of the forging example embodiments. In addition, the example embodiments of the disclosure may include configurations in which known techniques are added to the configurations described in the foregoing example embodiments.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

The processor 200 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the processor 200 illustrated in FIG. 3.

The invention claimed is:

1. A vehicle content presentation control system configured to operate in conjunction with a content providing system that provides content to an occupant on board a vehicle for viewing and/or listening, the vehicle content presentation control system comprising:
one or more processors; and
one or more memories communicably coupled to the one or more processors, wherein
the one or more processors are configured to:
execute an authentication process based on a license key;
execute a switching control process of switching between (1) a self-traveling mode in which the vehicle is permitted to travel, and (2) a presentation control mode that is a travel-inhibited state in which traveling of the vehicle is not permitted, wherein an entertainment performance is provided to the occupant including a driver, the entertainment performance being defined as presentation effects corresponding to the content, the effects being provided through control of one or more vehicle devices to enhance an experience of the occupant, the one or more vehicle devices including at least one vehicle traveling-related device related to traveling of the vehicle and/or at least one vehicle-installed device, the switching control process including determining whether the vehicle is in the travel-inhibited state based on one or more vehicle conditions, and switching to the presentation control mode when the vehicle is determined to be in the travel-inhibited state; and when the vehicle content presentation control system is authenticated by using an authorized license key in the authentication process, and presentation control data regarding the entertainment performance of the content and transmitted from the content providing system is received during the presentation control mode, control the one or more vehicle devices in accordance with the presentation control data or a progress status of the content based on the presentation control data to provide the entertainment performance to the occupant.

2. The vehicle content presentation control system according to claim 1, further comprising a compact-device attachment and detachment part to and from which a compact device holding a license key is physically attachable and detachable, the compact-device attachment and detachment part being configured to allow the compact device to be electrically coupled thereto, wherein when the compact device holding an authorized license key is attached to the compact-device attachment and detachment part, the one or more processors are configured to perform, as the authentication process, authentication assuming that the vehicle content presentation control system has the authorized license key.

3. The vehicle content presentation control system according to claim 1, wherein the one or more processors are configured to execute, when the presentation control data regarding the presentation and transmitted from the content providing system is received during the presentation control mode, and the vehicle content presentation control system is authenticated by using the authorized license key in the authentication process, a data conversion process of converting the presentation control data into predetermined control data, and control one or both of the vehicle traveling related device and the vehicle device, in accordance with the converted control data or the progress status of the content based on the converted control data.

4. The vehicle content presentation control system according to claim 1, wherein the one or more processors are configured to determine that the vehicle is in the travel-inhibited state when at least one of: a shift lever is in a parking range, a parking brake is applied, or a steering wheel is locked.

5. The vehicle content presentation control system according to claim 1, wherein the entertainment performance includes at least one of: seat motion, yawing, pitching, bouncing, vibration, air flow, temperature change, lighting effects, or synchronized audio output.

6. The vehicle content presentation control system according to claim 1, wherein the one or more vehicle devices include at least one of: a drive motor, a brake system, a suspension device, a steering device, an air conditioning system, a seat heater, a steering wheel heater, an audio system, a navigation system, or a lighting system.

7. The vehicle content presentation control system according to claim 1, wherein the at least one vehicle traveling-related device includes at least one of: a drive motor, a suspension device, an electric power steering device, or a brake system.

8. The vehicle content presentation control system according to claim 1, wherein the at least one vehicle-installed device includes at least one of: an air conditioning system, a seat heater, a steering wheel heater, an audio system, a navigation system, a power seat, a power window system, a wiper, a washer, a door lock, an interior light, or a lighting system.

9. The vehicle content presentation control system according to claim 1, wherein the one or more processors are configured to convert presentation effect data included in content data into the presentation control data to control the one or more vehicle devices.

10. A vehicle content presentation control system configured to operate in conjunction with a content providing system that provides content to an occupant on board a vehicle for viewing and/or listening, the vehicle content presentation control system comprising:

a connector configured to allow for physically and electrically detachable connection of the vehicle content presentation control system to one or more vehicle devices, the one or more vehicle devices including at least one vehicle traveling-related device related to traveling of the vehicle and/or at least one vehicle-installed device;

one or more processors; and one or more memories communicably coupled to the one or more processors, wherein the one or more processors are configured to execute an authentication process based on a license key, execute a switching control process of switching between (1) a self-traveling mode in which the vehicle is permitted to travel, and (2) a presentation control mode that is a travel-inhibited state in which traveling of the vehicle is not permitted, wherein an entertainment performance is provided to the occupant including a driver, the entertainment performance being defined as presentation effects corresponding to the content, the effects being provided through control of the one or more vehicle devices to enhance an experience of the occupant, the switching control process including determining whether the vehicle is in the travel-inhibited state based on one or more vehicle conditions, and switching to the presentation control mode when the vehicle is determined to be in the travel-inhibited state; and when presentation control data regarding the entertainment performance of the content and transmitted from the content providing system is received during the presentation control mode, and the vehicle content presentation control system is authenticated by using an authorized license key in the authentication process and is coupled to the one or more vehicle devices, control the one or more vehicle devices in accordance with the presentation control data or a progress status of the content based on the presentation control data to provide the entertainment performance to the occupant.

11. The vehicle content presentation control system according to claim 10, further comprising a compact-device attachment and detachment part to and from which a compact device holding a license key is physically attachable and detachable, the compact-device attachment and detachment part being configured to allow the compact device to be electrically coupled thereto, wherein when the compact device holding an authorized license key is attached to the compact-device attachment and detachment part, the one or more processors are configured to perform, as the authentication process, authentication assuming that the vehicle content presentation control system has the authorized license key.

12. The vehicle content presentation control system according to claim 10, wherein the one or more processors are configured to execute, when the presentation control data regarding the presentation and transmitted from the content providing system is received during the presentation control mode, and the vehicle content presentation control system is authenticated by using the authorized license key in the authentication process, a data conversion process of converting the presentation control data into predetermined control data, and control one or both of the vehicle traveling related device and the vehicle device, in accordance with the converted control data or the progress status of the content based on the converted control data.

13. A non-transitory computer readable recording medium containing a program to be applied to a computer configured to operate in conjunction with a content providing system that provides content to an occupant on board a vehicle for viewing and/or listening, the computer comprising:

one or more processors; and one or more memories communicably coupled to the one or more processors, the program causing, when executed by the computer, the computer to implement a method, the method comprising:

executing authentication based on a license key;

executing a switching control process of switching between
(1) a self-traveling mode in which the vehicle is permitted to travel, and
(2) a presentation control mode that is a travel-inhibited state in which traveling of the vehicle is not permitted, wherein an entertainment performance is provided to the occupant including a driver, the entertainment performance being defined as presentation effects corresponding to the content, the effects being provided through control of one or more vehicle devices to enhance an experience of the occupant, the one or more vehicle devices including at least one vehicle traveling-related device related to traveling of the vehicle and/or at least one vehicle-installed device, the switching control process including determining whether the vehicle is in the travel-inhibited state based on one or more vehicle conditions, and switching to the presentation control mode when the vehicle is determined to be in the travel-inhibited state; and when the computer is authenticated by using an authorized license key in the authentication, and presentation control data regarding the entertainment performance of the content and transmitted from the content providing system is received during the presentation control mode, controlling the one or more vehicle devices in accordance with the presentation control data or a progress status of the content based on the presentation control data to provide the entertainment performance to the occupant.

14. A non-transitory computer readable recording medium containing a program to be applied to a computer configured to operate in conjunction with a content providing system that provides content to an occupant on board a vehicle for viewing and/or listening, the computer comprising:

a connector configured to allow for physically and electrically detachable connection of the computer to one or more vehicle devices, the one or more vehicle devices including at least one vehicle traveling related device related to traveling of the vehicle and/or at least one vehicle-installed device;

one or more processors; and one or more memories communicably coupled to the one or more processors, the program causing, when executed by the computer, the computer to implement a method, the method comprising:

executing authentication based on a license key;

executing a switching control process of switching between
(1) a self-traveling mode in which the vehicle is permitted to travel, and
(2) a presentation control mode that is a travel-inhibited state in which traveling of the vehicle is not permitted, wherein an entertainment performance is provided to the occupant including a driver, the entertainment performance being defined as presentation effects corresponding to the content, the effects being provided through control of the one or more vehicle devices to enhance an experience of the occupant, the switching control process including determining whether the vehicle is in the travel-inhibited state based on one or more vehicle conditions, and switching to the presentation control mode when the vehicle is determined to be in the travel-inhibited state; and when presentation control data regarding the entertainment performance of the content and transmitted from the content providing system is received during the presentation control mode, and the computer is authenticated by using an authorized license key in the authentication and is coupled to the one or more vehicle devices, controlling the one or more vehicle devices, in accordance with the presentation control data or a progress status of the content based on the presentation control data.

\* \* \* \* \*